United States Patent
Horikita et al.

(10) Patent No.: US 9,640,801 B2
(45) Date of Patent: *May 2, 2017

(54) PROCESS FOR PRODUCING CATALYST CARRIER, PROCESS FOR PRODUCING COMPOSITE CATALYST, COMPOSITE CATALYST, AND FUEL CELL USING SAME

(71) Applicant: SHOWA DENKO K.K., Minato-ku, Tokyo (JP)

(72) Inventors: Masaki Horikita, Tokyo (JP); Kunchan Lee, Tokyo (JP); Ryuji Monden, Tokyo (JP); Chunfu Yu, Tokyo (JP); Yasuaki Wakizaka, Tokyo (JP); Takashi Sato, Tokyo (JP); Yoshinori Abe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,510

(22) Filed: Mar. 8, 2016

(65) Prior Publication Data

US 2016/0190605 A1    Jun. 30, 2016

Related U.S. Application Data

(63) Continuation of application No. 13/946,531, filed on Jul. 19, 2013, now Pat. No. 9,318,749, which is a
(Continued)

(30) Foreign Application Priority Data

Jan. 20, 2011  (JP) .................................. 2011-009736
Jan. 20, 2011  (JP) .................................. 2011-009737

(51) Int. Cl.
*H01M 4/88*    (2006.01)
*H01M 4/90*    (2006.01)
(Continued)

(52) U.S. Cl.
CPC ....... *H01M 4/8817* (2013.01); *H01M 4/8803* (2013.01); *H01M 4/8882* (2013.01);
(Continued)

(58) Field of Classification Search
CPC ............. H01M 4/8817; H01M 4/8803; H01M 4/8882; H01M 4/8885; H01M 4/9008;
(Continued)

(56) References Cited

U.S. PATENT DOCUMENTS

2008/0102350 A1    5/2008  Osaka et al.
2010/0086823 A1    4/2010  Koshino et al.
(Continued)

FOREIGN PATENT DOCUMENTS

EP    0 674 019 A1    9/1995
EP    2198962 A1    6/2010
(Continued)

OTHER PUBLICATIONS

Communication dated Jun. 2, 2014, issued by the European Patent Office is corresponding application No. 11856361.8.

*Primary Examiner* — Helen O Conley
(74) *Attorney, Agent, or Firm* — Sughrue Mion, PLLC

(57) ABSTRACT

A catalyst carrier production process includes a step (a) of mixing a transition metal compound (1), a nitrogen-containing organic compound (2), and a solvent to provide a catalyst carrier precursor solution; a step (b) of removing the solvent from the catalyst carrier precursor solution; and a step (c) of thermally treating a solid residue obtained in the step (b) at a temperature of 500 to 1100° C. to provide a catalyst carrier; wherein the transition metal compound (1) is partly or wholly a compound including a transition metal element (M1) selected from the group 4 and 5 elements of the periodic table as a transition metal element; and at least one
(Continued)

of the transition metal compound (1) and the nitrogen-containing organic compound (2) includes an oxygen atom.

9 Claims, 6 Drawing Sheets

Related U.S. Application Data continuation of application No. PCT/JP2011/066375, filed on Jul. 19, 2011.

(51) Int. Cl.
   *H01M 4/92* (2006.01)
   *H01M 8/1011* (2016.01)

(52) U.S. Cl.
   CPC ....... *H01M 4/8885* (2013.01); *H01M 4/9008* (2013.01); *H01M 4/9041* (2013.01); *H01M 4/9075* (2013.01); *H01M 4/921* (2013.01); *H01M 4/925* (2013.01); *H01M 8/1011* (2013.01); *Y02E 60/50* (2013.01); *Y02E 60/523* (2013.01); *Y02P 70/56* (2015.11)

(58) Field of Classification Search
   CPC .. H01M 4/9041; H01M 4/9075; H01M 4/921; H01M 4/925
   See application file for complete search history.

(56) References Cited

U.S. PATENT DOCUMENTS

| | | |
|---|---|---|
| 2010/0227253 A1 | 9/2010 | Monden et al. |
| 2010/0331172 A1 | 12/2010 | Monden et al. |
| 2011/0008709 A1 | 1/2011 | Shishikura et al. |
| 2011/0020729 A1 | 1/2011 | Monden et al. |
| 2011/0053040 A1 | 3/2011 | Monden et al. |

FOREIGN PATENT DOCUMENTS

| | | |
|---|---|---|
| EP | 2251081 A1 | 11/2010 |
| JP | 7-252664 A | 10/1995 |
| JP | 8-141400 A | 6/1996 |
| JP | 11-144745 A | 5/1999 |
| JP | 2001-256982 A | 9/2001 |
| JP | 2002-184427 A | 6/2002 |
| JP | 2003-257453 A | 9/2003 |
| JP | 2008-108594 A | 5/2008 |
| JP | 2008-135380 A | 6/2008 |
| JP | 4679815 B2 | 5/2011 |
| WO | 2008/111570 A1 | 9/2008 |
| WO | 2009/091043 A1 | 7/2009 |
| WO | 2009/104500 A1 | 8/2009 |
| WO | 2009/119523 A1 | 10/2009 |

PROCESS FOR PRODUCING CATALYST CARRIER, PROCESS FOR PRODUCING COMPOSITE CATALYST, COMPOSITE CATALYST, AND FUEL CELL USING SAME

CROSS REFERENCE TO RELATED APPLICATIONS

This application is a Continuation of U.S. application Ser. No. 13/946,531 filed Jul. 19, 2013, which is a Continuation of International Application No. PCT/JP2011/066375 filed Jul. 19, 2011, claiming priority based on Japanese Patent Application Nos. 2011-009736 and 2011-009737, filed Jan. 20, 2011, the contents of all of which are incorporated herein by reference in their entirety.

TECHNICAL FIELD

The present invention relates to a process for producing a catalyst carrier, a catalyst carrier produced by the same, a process for producing a composite catalyst used as a fuel cell electrode catalyst, a composite catalyst, and a fuel cell using them.

BACKGROUND ART

A fuel cell is classified into different types according to the kind of electrolyte and the kind of electrode. Typical ones include an alkaline type, a phosphate type, a molten carbonate type, a solid electrolyte type, and a solid polymer type. Among them, more attention is paid to a solid polymer type fuel cell that can operate in a range from a low temperature (approximately −40° C.) to approximately 120° C., which, in recent years, has been increasingly developed and utilized in practice as a low-pollution power source for automobiles. The solid polymer type fuel cell is, according to the kind of fuel used, classified into a hydrogen-oxygen type fuel cell using hydrogen as fuel and a direct methanol type fuel cell using methanol as fuel. Then, uses of the hydrogen-oxygen fuel cell in the fields of power sources for vehicles and stationary power sources are under study, and the direct methanol type fuel cell is expected to be applied to uses for cellular phones and uses for portable power sources, distributed power supplies, and the like. For application to those uses, high performance and long-term durability are desired.

In the solid polymer fuel cell, a solid polymer electrolyte is sandwiched between an anode and a cathode, and a fuel is fed to the anode and oxygen or air is fed to the cathode to reduce the oxygen at the cathode so as to produce electricity. The fuel used is mainly hydrogen, methanol, or the like.

Conventionally, to increase the reaction rate of a fuel cell to enhance the energy conversion efficiency of the fuel cell, a catalyst-containing layer (hereinafter described also as "fuel cell catalyst layer") has been provided on the surface of a cathode (oxygen electrode) and the surface of an anode (fuel electrode) of the fuel cell. In general, the catalyst is a noble metal. Among noble metals, platinum has been mainly used because of its stability at high potential and high activity. Additionally, carbon has conventionally been used as a carrier that supports the catalyst metal. Such a noble metal as platinum is used in large amount as a catalyst, resulting in significant increase in the cost of the fuel cell. This has been an obstacle in the development of fuel cells. In addition, due to limited deposits of noble metals and the like, studies are being conducted to reduce the amount of noble metal used.

In Patent Document 1, studies for reduction of the amount of a noble metal used have been made which include increasing effective surface area and mass activity by micronization and high dispersion of platinum, and alloying with other metals. However, under conditions of fuel cell operation, deterioration due to melting of platinum occurs. Accordingly, in order to maintain sufficient performance, there seems to be a limitation on the reduction of the amount of platinum used.

Meanwhile, to solve the cost problem, Patent Documents 2 and 3 reveal studies on oxycarbonitrides of transition metals such as tantalum and niobium, as alternatives to platinum. The abundance ratios of these transition metals in the earth are higher than that of platinum, and the metals are less expensive than platinum. Accordingly, the oxycarbonitrides of the transitional metals are expected as electrode catalysts for fuel cells. However, there has been a problem in which, as the electrode catalysts, such oxycarbonitrides have lower performance than platinum.

Patent Document 4 proposes a method in which in order to assist the performance of an oxycarbonitride of a transition metal, platinum is compounded with the oxycarbonitride thereof used as a carrier. The method employs a technique in which a carbide, a nitride, and an oxide of a transition metal such as niobium are mixed together and sintered at high temperature to produce a oxycarbonitride of niobium, and then the oxycarbonitride is used as a carrier to compound platinum therewith. The catalyst carrier has higher performance than in conventional platinum reduction methods and conventional transition metal oxycarbonitrides. However, despite that, the catalyst carrier has not yet reached a level of performance that can be used in practice.

In addition, the direct methanol type fuel cell has problems that, due to the crossover of methanol as liquid fuel, fuel utilization efficiency is degraded and the potential at the cathode is reduced, thereby resulting in significant degradation of energy conversion efficiency in the fuel cell. The methanol crossover is a phenomenon in which methanol moves from the anode to the cathode through a polymer electrolyte membrane. After reaching the cathode, the methanol is directly oxidized on the cathode catalyst surface, so that there occurs a problem that the potential at the cathode is lowered.

In general, the cathode catalyst of a direct methanol type fuel cell is a platinum catalyst. The platinum catalyst is highly active and highly stable. However, the platinum catalyst exhibits highly catalytic performance not only for the oxygen reduction reaction but also for the methanol oxidation reaction described above, thus promoting also the oxidation reaction of the liquid fuel reaching the cathode due to the crossover. As a result, an oxygen reduction potential at the cathode, together with an oxidation potential of the liquid fuel, forms a mixed potential, resulting in a significantly reduced level.

Additionally, in the direct methanol type fuel cell, the platinum catalyst is used in larger amount than in fuel cells using hydrogen, in order to promote reaction at the anode and also suppress potential reduction at the anode due to the fuel crossover. However, since platinum is expensive and platinum resources are limited, development of an alternative catalyst and significant reduction of use of platinum are strongly desired.

To suppress the crossover of fuel liquid in a direct methanol type fuel cell, there have been developed electrolyte membranes that hardly allow the transmission of liquid fuel and electrolyte membranes that do not allow the crossover of fuel liquid (for example, see Patent Documents 5 to 7).

However, it is extremely difficult for the electrolyte membranes described in Patent Documents 5 to 7 to significantly reduce the crossover of liquid fuel while maintaining high ionic conductivity and stability. Additionally, even with use of an electrolyte membrane suppressing the transmission of liquid fuel to some extent, the transmission of liquid fuel occurs more than a little along with the transmission of water in the electrolyte membrane, whereby the potential reduction at the cathode is inevitable.

There have also been reported catalysts that selectively perform only oxygen reduction without oxidizing methanol fuel which has reached the cathode due to methanol crossover.

Patent Documents 8 and 9 have reported Pd and Pd alloys having low methanol oxidation properties and high oxygen reduction activity, the Pd alloys being alloys with a noble metal such as Ru, Rh, Os, Ir, Pt, Au, or Ag (Patent Document 8) and alloy catalysts prepared by alloying with a transition metal such as Co, Cr, Ni, Mo, or W (Patent Document 9). However, although the catalyst metal described in Patent Document 8 is supported on a carbon carrier, high performance resulting from a synergistic effect of the carbon carrier and the Pd catalyst metal cannot be expected. In addition, the carbon carrier is easily corroded under a cathode atmosphere, whereby elution or desorption of the supported Pd catalyst metal may be accelerated. The Pd catalyst metal described in Patent Document 9 is produced by a sputtering method without using any carrier, so that it cannot be expected to increase a specific surface area of the catalyst metal by use of a carrier. Particularly, regarding the Pd catalyst metals described in Patent Documents 8 and 9 above, since studies have been made on oxygen reduction activity in a methanol-containing acidic aqueous solution electrolyte, it is difficult to confirm a cathode performance improvement effect by methanol crossover in an actual fuel cell. Therefore, cell evaluation is needed to be conducted by production of a membrane electrode assembly (MEA).

Meanwhile, Pd alloys (Pd—Sn, Pd—Au, Pd—Co, and Pd—$WO_3$) described in Patent Document 10 are limited to a direct methanol type fuel cell using an alkaline electrolyte, and their methanol crossover suppression effect has not been confirmed in a direct methanol type fuel cell using an acidic solid electrolyte. In addition, evaluation has been conducted using a micronized Pd alloy, without using any carrier. However, for application to actual fuel cells, the pd alloy is needed to be supported on a carrier that can increase specific surface areas of the Pd alloy catalyst metals and catalyst utilization efficiency to conduct cell evaluation by production of a membrane electrode assembly (MEA).

CITATION LIST

Patent Documents

[Patent Document 1] JP-A-1996-141400
[Patent Document 2] JP-A-2008-108594
[Patent Document 3] WO 2009/091043
[Patent Document 4] WO 2009/104500
[Patent Document 5] JP-A-1999-144745
[Patent Document 6] JP-A-2002-184427
[Patent Document 7] JP-A-2003-257453
[Patent Document 8] JP-A-2001-256982
[Patent Document 9] Japanese Patent No. 4679815
[Patent Document 10] JP-A-2008-135380

SUMMARY OF INVENTION

Problems to be Solved by Invention

The present invention has been intended to solve the problems of the conventional techniques as described above.

It is an object of the present invention to provide a process for producing a catalyst carrier that can reduce the amount of a catalyst metal used in an electrode catalyst by enhancing activity of the supported catalyst metal, while maintaining high performance, thereby achieving cost reduction of the electrode catalyst. In addition, it is another object of the invention to provide a process for producing a low cost fuel cell electrode catalyst that can exhibit high performance even with a low catalyst metal content.

It is still another object of the present invention to provide a process for producing an electrode catalyst for a direct methanol type fuel cell, which has high oxidation reduction performance without being affected by methanol crossover in the direct methanol type fuel cell.

Means for Solving Problems

The present inventors conducted extensive and intensive studies to solve the problems of the conventional techniques described above and consequently found that, in the production of a catalyst carrier from a transition metal compound and a nitrogen-containing organic compound, use of a specific method allows high catalyst activity to be exhibited when a catalyst metal is supported on the obtained catalyst carrier, and the high catalytic performance can be achieved by a composite catalyst including the catalyst carrier obtained as a thermally heated product produced from the transition metal compound and the nitrogen-containing organic compound and the catalyst metal, thereby resulting in completion of the present invention.

Specifically, the present invention relates to, for example, the following [1] to [29]:

[1] A process for producing a catalyst carrier comprising:
a step (a) of mixing a transition metal compound (1), a nitrogen-containing organic compound (2) and a solvent to provide a catalyst carrier precursor solution;
a step (b) of removing the solvent from the catalyst carrier precursor solution; and
a step (c) of thermally treating a solid residue obtained in the step (b) at a temperature of 500 to 1100° C. to provide a catalyst carrier;
wherein
the transition metal compound (1) is partly or wholly a compound comprising a transition metal element (M1) selected from the group 4 and 5 elements of the periodic table as a transition metal element; and
at least one of the transition metal compound (1) and the nitrogen-containing organic compound (2) comprises an oxygen atom.

[2] The process for producing a catalyst carrier according to the [1], wherein the transition metal element (M1) is at least one selected from the group consisting of titanium, zirconium, niobium and tantalum.

[3] The process for producing a catalyst carrier according to the [1] or [2], wherein the transition metal compound (1) further comprises a second transition metal compound containing at least one transition metal element (M2) selected from iron, nickel, chromium, cobalt, vanadium and manganese.

[4] The process for producing a catalyst carrier according to any one of the [1] to [3], wherein the transition metal compound (1) is at least one selected from the group consisting of a metal phosphate, a metal sulfate, a metal nitrate, a metal organic acid salt, a metal oxyhalide, a metal alkoxide, a metal halide, a metal halogen oxoate, a metal hypohalogenite and a metal complex.

[5] The process for producing a catalyst carrier according to any one of the [1] to [4], wherein in the step (a), a precipitation suppressant comprising a compound having a diketone structure is further mixed.

[6] The process for producing a catalyst carrier according to any one of the [1] to [5], wherein in the step (a), a solution of the transition metal compound (1) is mixed with the precipitation suppressant, and then the resultant solution is mixed with the nitrogen-containing organic compound (2).

[7] The process for producing a catalyst carrier according to any one of the [1] to [6], wherein the nitrogen-containing organic compound (2) has, in its molecule, at least one selected from functional groups such as an amino group, a nitrile group, an imide group, an imine group, a nitro group, an amide group, an azide group, an aziridine group, an azo group, an isocyanate group, an isothiocyanate group, an oxime group, a diazo group, a nitroso group; and a pyrrole ring, a porphyrin ring, an imidazole ring, a pyridine ring, a pyrimidine ring and a pyrazine ring.

[8] The process for producing a catalyst carrier according to any one of the [1] to [7], wherein the nitrogen-containing organic compound (2) further has, in its molecule, at least one group selected from a hydroxyl group, a carboxyl group, an aldehyde group, an acid halide group, a sulfo group, a phosphoric acid group, a ketone group, an ether group and an ester group.

[9] A catalyst carrier obtained by the process for producing a catalyst carrier according to any one of the [1] to [8], wherein the ratio of the numbers of atoms of the transition metal element, carbon, nitrogen and oxygen that constitute the catalyst carrier (the transition metal element:carbon:nitrogen:oxygen) is 1:x:y:z wherein $0<x\leq 7$, $0<y\leq 2$ and $0<z\leq 3$.

[10] A catalyst carrier obtained by the process for producing a catalyst carrier according to the [3], wherein the ratio of the numbers of atoms of the transition metal element (M1), the transition metal element (M2), carbon, nitrogen and oxygen that constitute the catalyst carrier (the transition metal element (M1):the transition metal element (M2):carbon:nitrogen:oxygen) is (1-a):a:x:y:z wherein $0<a\leq 0.5$, $0<x\leq 7$, $0<y\leq 2$ and $0<z\leq 3$.

[11] The catalyst carrier according to the [9] or [10], which has a specific surface area as calculated by BET method of 30 to 400 $m^2/g$.

[12] A process for producing a composite catalyst comprising:

a step (a) of mixing a transition metal compound (1), a nitrogen-containing organic compound (2) and a solvent to provide a thermally treated product precursor solution;

a step (b) of removing the solvent from the thermally treated product precursor solution;

a step (c) of thermally treating a solid residue obtained in the step (b) at a temperature of 500 to 1100° C. to provide a thermally treated product; and a step (d) of providing a composite catalyst comprising the thermally treated product and a catalyst metal;

wherein the transition metal compound (1) is partly or wholly a compound comprising a transition metal element (M1) selected from the group 4 and 5 elements of the periodic table as a transition metal element; and at least one of the transition metal compound (1) and the nitrogen-containing organic compound (2) comprises an oxygen atom.

[13] The process for producing a composite catalyst according to the [12], wherein the transition metal element (M1) is at least one selected from the group consisting of titanium, zirconium, niobium and tantalum.

[14] The process for producing a composite catalyst according to the [12] or [13], wherein the transition metal compound (1) further comprises a second transition metal compound containing at least one transition metal element (M2) selected from iron, nickel, chromium, cobalt, vanadium and manganese.

[15] The process for producing a composite catalyst according to any one of the [12] to [14], wherein the transition metal compound (1) is at least one kind selected from the group consisting of a metal phosphate, a metal sulfate, a metal nitrate, a metal organic acid salt, a metal oxyhalide, a metal alkoxide, a metal halide, a metal halogen oxoate, a metal hypohalogenite and a metal complex.

[16] The process for producing a composite catalyst according to any one of the [12] to [15], wherein in the step (a), a precipitation suppressant comprising a compound having a diketone structure is further mixed.

[17] The process for producing a composite catalyst according to any one of the [12] to [16], wherein in the step (a), a solution of the transition metal compound (1) is mixed with the precipitation suppressant, and then the resultant solution is mixed with the nitrogen-containing organic compound (2).

[18] The process for producing a composite catalyst according to any one of the [12] to [17], wherein the nitrogen-containing organic compound (2) has, in its molecule, at least one selected from functional groups such as an amino group, a nitrile group, an imide group, an imine group, a nitro group, an amide group, an azide group, an aziridine group, an azo group, an isocyanate group, an isothiocyanate group, an oxime group, a diazo group, a nitroso group; and a pyrrole ring, porphyrin ring, an imidazole ring, a pyridine ring, a pyrimidine ring and a pyrazine ring.

[19] The process for producing a composite catalyst according to any one of the [12] to [18], wherein the nitrogen-containing organic compound (2) further has, in its molecule, at least one group selected from a hydroxyl group, a carboxyl group, an aldehyde group, an acid halide group, a sulfo group, a phosphoric acid group, a ketone group, an ether group and an ester group.

[20] The process for producing a composite catalyst according to any one of the [12] to [19], wherein the catalyst metal is at least one selected from the group consisting of platinum, gold, silver, copper, palladium, rhodium, ruthenium, iridium, osmium, rhenium and an alloy made of two or more thereof.

[21] The process for producing a composite catalyst according to any one of the [12] to [20], wherein the content of the catalyst metal is 0.01 to 50% by weight based on the total weight of the composite catalyst.

[22] The process for producing a composite catalyst according to any one of the [12] to [21], wherein the step (d) is carried out by any one of the following methods (1) to (3):

(1) a method comprising a step of dispersing the thermally treated product in a catalyst metal precursor solution and evaporating the resultant dispersion to dryness; and thereafter a step of thermally treating the resultant solid;

(2) a method comprising a step of dispersing the thermally treated product in a catalyst metal precursor colloidal solution to adsorb the catalyst metal precursor colloid on the thermally treated product, thereby making the thermally treated product carry the catalyst metal; and (3) a method comprising a step of adjusting the pH of a mixed solution of a solution containing one or more metal compound serving as a material of the thermally treated precursor and a catalyst precursor colloidal solution to provide a precursor of the thermally treated product and simultaneously to adsorb the catalyst precursor colloid; and a step of thermally treating the resultant product.

[23] A composite catalyst obtained by the process for producing a composite catalyst according to any one of the [12] to [22].

[24] The composite catalyst according to the [23], wherein the ratio of the numbers of atoms of the transition metal element, carbon, nitrogen and oxygen that constitute the thermally treated product (the transition metal element:carbon:nitrogen:oxygen) is 1:x:y:z wherein $0<x\leq7$, $0<y\leq2$ and $0<z\leq3$.

[25] The composite catalyst obtained by the process for producing a composite catalyst according to the [14], wherein the ratio of the numbers of atoms of the transition metal element (M1), the transition metal element (M2), carbon, nitrogen and oxygen that constitute the thermally treated product (the transition metal element (M1):the transition metal element (M2):carbon:nitrogen:oxygen) is (1-a):a:x:y:z wherein $0<a\leq0.5$, $0<x\leq7$, $0<y\leq2$ and $0<z\leq3$.

[26] A catalyst layer for a fuel cell comprising the composite catalyst according to any one of the [23] to [25].

[27] A membrane electrode assembly comprising a cathode, an anode and an electrolyte membrane interposed between the cathode and the anode,
wherein the cathode and/or the anode is an electrode comprising the catalyst layer for a fuel cell according to the [26] and a porous support; and
the catalyst layer for a fuel cell further comprises an electron conductive substance.

[28] A fuel cell comprising the membrane electrode assembly according to the [27].

[29] The fuel cell according to the [28], which is a direct methanol type fuel cell.

Advantageous Effects of Invention

The process for producing a catalyst carrier according to the present invention can provide a catalyst carrier that enhances the activity of a supported catalyst metal. Accordingly, by supporting the catalyst metal on the obtained catalyst carrier, an electrode catalyst having high activity can be obtained and the amount of use of the supported catalyst metal can be reduced, thereby allowing cost reduction of the electrode catalyst.

In addition, the composite catalyst obtained by the production process of the present invention becomes a fuel cell electrode catalyst having high activity despite a very small catalyst metal content.

Furthermore, in order to suppress cathode performance degradation due to methanol crossover in a direct methanol type fuel cell, palladium and a palladium alloy are compounded as the catalyst metal, whereby the obtained composite catalyst becomes an electrode catalyst having high activity.

DESCRIPTION OF EMBODIMENTS

Figure 1:
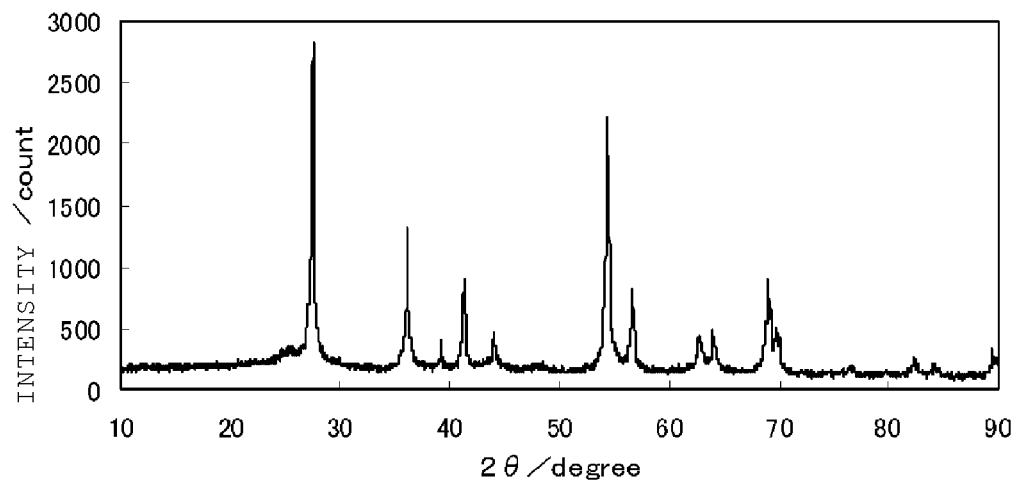
FIG. 1 denotes a powder X-ray diffraction spectrum of a carrier (1) obtained in Example 1.

Processes for Producing Catalyst Carrier and Composite Catalyst

The process for producing a catalyst carrier of the present invention comprises:
a step (a) of mixing a transition metal compound (1), a nitrogen-containing organic compound (2) and a solvent to provide a catalyst carrier precursor solution;
a step (b) of removing the solvent from the catalyst carrier precursor solution; and
a step (c) of thermally treating a solid residue obtained in the step (b) at a temperature of 500 to 1100° C. to provide a catalyst carrier;
wherein
the transition metal compound (1) is partly or wholly a compound comprising a transition metal element (M1) selected from the group 4 and 5 elements of the periodic table as a transition metal element; and
at least one of the transition metal compound (1) and the nitrogen-containing organic compound (2) comprises an oxygen atom.

In addition, the process for producing a composite catalyst of the present invention comprises:

a step (a) of mixing a transition metal compound (1), a nitrogen-containing organic compound (2) and a solvent to provide a thermally treated product precursor solution;

a step (b) of removing the solvent from the thermally treated product precursor solution;

a step (c) of thermally treating a solid residue obtained in the step (b) at a temperature of 500 to 1100° C. to provide a thermally treated product; and a step (d) of providing a composite catalyst including the thermally treated product and a catalyst metal;

wherein the transition metal compound (1) is partly or wholly a compound comprising a transition metal element (M1) selected from the group 4 and 5 elements of the periodic table as a transition metal element; and at least one of the transition metal compound (1) and the nitrogen-containing organic compound (2) comprises an oxygen atom.

The composite catalyst obtained by the process for producing a composite catalyst described above is suitably used as a fuel cell electrode catalyst, and a thermally treated product obtained in the process of performing the process for producing a composite catalyst can serve as a catalyst carrier. From that viewpoint, the process for producing a composite catalyst described above can be regarded also as a process for producing a fuel cell electrode catalyst in the relationship with the process for producing a catalyst carrier described above.

That is, a process for producing a fuel cell electrode catalyst of the present invention comprises:

a step of producing a catalyst carrier by the above process for producing a catalyst carrier and a step (d) of supporting a catalyst metal on the catalyst carrier to give a supported catalyst.

In the present specification, atoms and ions are described as "atoms" without distinguishing strictly, unless otherwise noted.

(Step (a))

In the step (a), at least a transition metal compound (1), a nitrogen-containing organic compound (2), and a solvent are mixed together to give a thermally treated product precursor solution. The thermally treated product precursor solution is defined as a catalyst carrier precursor solution in the process for producing a catalyst carrier of the present invention.

In the step (a), a fluorine-containing compound may be further mixed with them.

Examples of mixing procedures include:

a procedure (i): a solvent is provided in a single container and then, the transition metal compound (1) and the nitrogen-containing organic compound (2) are added thereto and dissolved so as to mix them together, and a procedure (ii): a solution of the transition metal compound (1) and a solution of the nitrogen-containing organic compound (2) are prepared and mixed together.

If a highly soluble solvent is different between the individual components, the procedure (i) is preferable. In addition, when the transition metal compound (1) is, for example, a metal halide as described below, the procedure (i) is preferable, whereas when the transition metal compound (1) is, for example, a metal alkoxide or a metal complex as described below, the procedure (ii) is preferable.

When a first transition metal compound and a second transition metal compound described below are used as the transition metal compound (1), a preferable procedure in the procedure (ii) includes a procedure (ii'): a solution of the first transition metal compound, as well as a solution of the second transition metal compound and the nitrogen-containing organic compound (2) are prepared and mixed together.

The mixing operation is preferably performed while stirring in order to increase a dissolution rate of each component in the solvent.

When mixing the solution of the transition metal compound (1) with the solution of the nitrogen-containing organic compound (2), it is preferable to feed one of the solutions into the other thereof at a constant rate using a pump or the like.

Alternatively, it is also preferable to add the solution of the transition metal compound (1) little by little (that is, the whole amount thereof is not added at once) to the solution of the nitrogen-containing organic compound (2).

The present inventors assume that the thermally treated product precursor solution includes a reaction product between the transition metal compound (1) and the nitrogen-containing organic compound (2). Solubility of such a reaction product in the solvent varies depending on combinations of the transition metal compound (1), the nitrogen-containing organic compound (2), the solvent, and the like.

Therefore, for example, when the transition metal compound (1) is a metal alkoxide or a metal complex, although depending on the kind of the solvent and the kind of the nitrogen-containing organic compound (2), the thermally treated product precursor solution preferably does not contain any precipitate or dispersoid, and, if any, the amounts of them are small (for example, 10% by weight or less, preferably 5% by weight or less, and more preferably 1% by weight or less of a total amount of the solution). In addition, the thermally treated product precursor solution is preferably transparent, and for example, a measurement value obtained by a liquid transparency measurement method described in JIS K0102 is preferably 1 cm or more, more preferably 2 cm or more, and still more preferably 5 cm or more.

Meanwhile, for example, when the transition metal compound (1) is a metal halide, although depending on the kind of the solvent and the kind of the nitrogen-containing organic compound (2), a precipitate tends to be formed in the thermally treated product precursor solution, in which the precipitate is assumed to be a reaction product between the transition metal compound (1) and the nitrogen-containing organic compound (2).

In the step (a), the transition metal compound (1), the nitrogen-containing organic compound (2), and the solvent may be placed in a container that can be pressurized, such as an autoclave, and mixed together under ordinary or higher pressure.

The temperature for mixing the transition metal compound (1), the nitrogen-containing organic compound (2), and the solvent is, for example, 0 to 60° C. From a presumption that a complex is formed from the transition metal compound (1) and the nitrogen-containing organic compound (2), the present inventors assume that an excessively high temperature causes hydrolysis of the complex to produce a precipitate of hydroxide in a case of a water-containing solvent, so that a good thermally treated product cannot be obtained. Conversely, the present inventors assume that, if the temperature is excessively low, the transition metal compound (1) is precipitated before the formation of the complex, resulting in the production of a poor quality thermally treated product. As used herein, the "thermally treated product" serves as a catalyst carrier when seen in terms of the process for producing a catalyst carrier of the present invention. From this viewpoint, if the temperature is excessively high during the mixing of the transition metal compound (1), the nitrogen-containing organic compound (2), and a solvent, it seems impossible to obtain a good catalyst carrier, whereas if it is excessively low, no good catalyst carrier seems to be obtainable.

The thermally treated product precursor solution preferably does not contain any precipitate or dispersoid, but may contain these substances in small amount (for example, 5% by weight or less, preferably 2% by weight or less, and more preferably 1% by weight or less of the total amount of the solution).

The thermally treated product precursor solution is preferably transparent, and for example, a measurement value obtained by the liquid transparency measurement method described in JIS K0102 is preferably 1 cm or more, more preferably 2 cm or more, and still more preferably 5 cm or more.

<Transition Metal Compound (1)>

The transition metal compound (1) is partly or wholly a compound including a transition metal element M1 selected from the group 4 and 5 elements of the periodic table as a transition metal element.

The transition metal element M1 is selected from the group 4 and 5 elements of the periodic table, specifically from titanium, zirconium, hafnium, niobium, tantalum, and vanadium. From the viewpoint of cost and performance obtained when the catalyst metal is supported on the catalyst carrier, in other words, from the viewpoint of cost and the performance of the resultant composite catalyst, among those elements, preferable are titanium, zirconium, niobium, and tantalum, and more preferable are titanium and zirconium. These may be used alone or in combination of two or more thereof.

Preferably, the transition metal compound (1) has at least one selected from an oxygen atom and a halogen atom, and specific examples thereof include a metal phosphate, a metal sulphate, a metal nitrate, a metal organic acid salt, a metal oxyhalide (or an intermediate hydrolysate of a metal halide), a metal alkoxide, a metal halide, a metal halogen oxoate, and a metal hypohalogenite, and a metal complex. These may be used alone or in combination of two or more thereof.

The transition metal compound (1) having an oxygen atom is preferably selected from metal alkoxides, acetylacetone complexes, metal oxychlorides, and metal sulfates, more preferably metal alkoxides and acetylacetone complexes from the viewpoint of cost, and still more preferably metal alkoxides and acetylacetone complexes from the viewpoint of solubility into the solvent.

The metal alkoxides are preferably methoxide, propoxide, isopropoxide, ethoxide, butoxide, and isobutoxide of the metal, and more preferably isopropoxide, ethoxide, and butoxide of the metal. The metal alkoxides may have one alkoxy group or two or more alkoxy groups.

The metal halide is preferably a metal chloride, a metal bromide, or a metal iodide; and the metal oxyhalide is preferably a metal oxychloride, a metal oxybromide, or a metal oxyiodide.

Specific examples of the transition metal compound including the transition metal element M1 include:

titanium compounds such as titanium tetramethoxide, titanium tetraethoxide, titanium tetrapropoxide, titanium tetraisopropoxide, titanium tetrabutoxide, titanium tetraisobutoxide, titanium tetrapentoxide, titanium tetraacetylacetonate, titanium oxydiacetylacetonate, tris(acetylacetonato) titanium(II) chlorides, titanium tetrachloride, titanium trichloride, titanium oxychloride, titanium tetrabromide, titanium tribromide, titanium oxybromide, titanium tetraiodide, titanium triiodide, and titanium oxyiodide;

niobium compounds such as niobium pentamethoxide, niobium pentaethoxide, niobium pentaisopropoxide, niobium pentabutoxide, niobium pentapentoxide, niobium pentachloride, niobium oxychloride, niobium pentabromide, niobium oxybromide, niobium pentaiodide, and niobium oxyiodide;

zirconium compounds such as zirconium tetramethoxide, zirconium tetraethoxide, zirconium tetrapropoxide, zirconium tetraisopropoxide, zirconium tetrabutoxide, zirconium tetraisobutoxide, zirconium tetrapentoxide, zirconium tetraacetylacetonate, zirconium tetrachloride, zirconium oxychloride, zirconium tetrabromide, zirconium oxybromide, zirconium tetraiodide, and zirconium oxyiodide;

tantalum compounds such as tantalum pentamethoxide, tantalum pentaethoxide, tantalum pentaisopropoxide, tantalum pentabutoxide, tantalum pentapentoxide, tantalum tetraethoxyacetylacetonate, tantalum pentachloride, tantalum oxychloride, tantalum pentabromide, tantalum oxybromide, tantalum pentaiodide and tantalum oxyiodide;

hafnium compounds such as hafnium tetramethoxide, hafnium tetraethoxide, hafnium tetrapropoxide, hafnium tetraisopropoxide, hafnium tetrabutoxide, hafnium tetraisobutoxide, hafnium tetrapentoxide, hafnium tetraacetylacetonate, hafnium tetrachloride, hafnium oxychloride, hafnium bromide, hafnium oxybromide, hafnium iodide, and hafnium oxyiodide; and vanadium compounds such as vanadium oxytrimethoxide, vanadium oxytriethoxide, vanadium oxytriisopropoxide, vanadium oxytributoxide, vanadium(III) acetylacetonate, vanadium(IV) acetylacetonate, vanadium pentachloride, vanadium oxychloride, vanadium pentabromide, vanadium oxybromide, vanadium pentaiodide and vanadium oxyiodide. These may be used alone or in combination of two or more thereof.

Among these compounds, in terms of the fact that the obtained thermally treated product, namely, the obtained catalyst carrier results in microparticles with a uniform particle diameter having high activity, preferable are titanium tetraethoxide, titanium tetrachloride, titanium oxychloride, titanium tetraisopropoxide, titanium tetraacetylacetonate, niobium pentaethoxide, niobium pentachloride, niobium oxychloride, niobium pentaisopropoxide, zirconium tetraethoxide, zirconium tetrachloride, zirconium oxychloride, zirconium tetraisopropoxide, zirconium tetraacetylacetonate, tantalum pentamethoxide, tantalum pentaethoxide, tantalum pentachloride, tantalum oxychloride, tantalum pentaisopropoxide, and tantalum tetraethoxyacetylacetonate; and more preferable are titanium tetraisopropoxide, titanium tetraacetylacetonate, niobium ethoxide, niobium isopropoxide, zirconium oxychloride, zirconium tetraisopropoxide, and tantalum pentaisopropoxide.

In addition, the transition metal compound (1) may be a combination of a transition metal compound (hereinafter referred to also as "first transition metal compound") including, as a transition metal element, a transition metal element M1 of the group 4 or the group 5 of the periodic table and a transition metal compound (hereinafter referred to also as "a second transition metal compound") including, as a transition metal element, an element which is different from the transition metal element M1 and which is at least one transition metal element M2 selected from iron, nickel, chromium, cobalt, vanadium, and manganese. However, when the transition metal element M1 is vanadium, the transition metal element M2 can be at least one selected from transition elements other than vanadium, namely, iron, nickel, chromium, cobalt, and manganese. Use of the second transition metal compound can improve the performance obtained by supporting the catalyst metal on the catalyst carrier, in other words, the performance of the resultant composite catalyst.

Observation of an XPS spectrum of the thermally treated product, namely, the catalyst carrier leads to a presumption that use of the second transition metal compound promotes formation of a bond between the transition metal element (M1) (for example, titanium) and a nitrogen atom, consequently improving the performance obtained by supporting the catalyst metal on the catalyst carrier, in other words, the performance of the composite catalyst.

As the transition metal element M2 in the second transition metal compound, preferred are iron and chromium, and more preferred is iron, from the viewpoint of a balance between cost and the performance obtained by supporting the catalyst metal on the catalyst carrier, in other words, from the viewpoint of a balance between cost and the performance of the resultant composite catalyst.

Specific examples of the second transition metal compound include:

iron compounds such as iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron (II) nitrate, iron(III) nitrate, iron(II) oxalate, iron(III) oxalate, iron(II) phosphate, iron(III) phosphate ferrocene, iron(II) hydroxide, iron (III) hydroxide, iron (II) oxide, iron(III) oxide, triiron tetraoxide, iron(II) acetate, iron(II) lactate, and iron(III) citrate;

nickel compounds such as nickel(II) chloride, nickel(II) sulfate, nickel(II) sulfide, nickel(II) nitrate, nickel(II) oxalate, nickel(II) phosphate, nickelocene, nickel(II) hydroxide, nickel(II) oxide, nickel(II) acetate, and nickel(II) lactate;

chromium compounds such as chromium(II) chloride, chromium (III) chloride, chromium(III) sulfate, chromium (III) sulfide, chromium(III) nitrate, chromium(III) oxalate, chromium(III) phosphate, chromium(III) hydroxide, chromium(II) oxide, chromium(III) oxide, chromium(IV) oxide, chromium(VI) oxide, chromium(II) acetate, chromium(III) acetate, and chromium(III) lactate;

cobalt compounds such as cobalt(II) chloride, cobalt(III) chloride, cobalt(II) sulfate, cobalt(II) sulfide, cobalt(II) nitrate, cobalt(III) nitrate, cobalt(II) oxalate, cobalt(II) phosphate, cobaltocene, cobalt(II) hydroxide, cobalt(II) oxide, cobalt(III) oxide, tricobalt tetraoxide, cobalt(II) acetate, and cobalt(II) lactate;

vanadium compounds such as vanadium(II) chloride, vanadium(III) chloride, vanadium(IV) chloride, vanadium (IV) oxysulfate, vanadium(III) sulfide, vanadium(IV) oxyoxalate, vanadium metallocene, vanadium(V) oxide, vanadium acetate, and vanadium citrate; and manganese compounds such as manganese(II) chloride, manganese(II) sulfate, manganese(II) sulfide, manganese(II) nitrate, manganese(II) oxalate, manganese(II) hydroxide, manganese(II) oxide, manganese(III) oxide, manganese(II) acetate, manganese(II) lactate, and manganese citrate. These may be used alone or in combination of two or more thereof.

Among these compounds, preferable are:

iron(II) chloride, iron(III) chloride, potassium ferrocyanide, potassium ferricyanide, ammonium ferrocyanide, ammonium ferricyanide, iron(II) acetate, iron(II) lactate, nickel(II) chloride, nickel(II) acetate, nickel(II) lactate, chromium(II) chloride, chromium(III) chloride, chromium(II) acetate, chromium(III) acetate, chromium(III) lactate, cobalt(II) chloride, cobalt(III) chloride, cobalt(II) acetate, cobalt(II) lactate, vanadium(II) chloride, vanadium(III) chloride, vanadium (IV) chloride, vanadium(IV) oxysulfate, vanadium acetate, vanadium citrate, manganese(II) chloride, manganese(II) acetate, and manganese(II) lactate; and more preferable are:

iron(II) chloride, iron(III) chloride, potassium ferrocyanide, potassium ferricyanide, ammonium ferrocyanide, ammonium ferricyanide, iron(II) acetate, iron(II) lactate, chromium(II) chloride, chromium(III) chloride, chromium (II) acetate, chromium(III) acetate and chromium(III) lactate.

<Nitrogen-Containing Organic Compound (2)>

The nitrogen-containing organic compound (2) is preferably a compound that can be a ligand capable of being coordinated to a metal atom in the transition metal compound (1) (preferably a compound that can form a mononuclear complex), and more preferably a compound that can be a multidentate ligand (preferably a bidentate ligand or a tridentate ligand) (which can form a chelate).

The nitrogen-containing organic compound (2) that can be used may be a single compound or a combination of two or more compounds.

Preferably, the nitrogen-containing organic compound (2) has a functional group such as an amino group, a nitrile group, an imide group, an imine group, a nitro group, an amide group, an azide group, an aziridine group, an azo group, an isocyanate group, an isothiocyanate group, an oxime group, a diazo group, or a nitroso group, or a ring such as a pyrrole ring, a porphyrin ring, an imidazole ring, a pyridine ring, a pyrimidine ring, or a pyrazine ring (these functional groups and rings are also collectively referred to also as a "nitrogen-containing molecular group").

The present inventors assume that the nitrogen-containing organic compound (2), in the case it has the nitrogen-containing molecular group in its molecule, is able to be more strongly coordinated to a metal atom derived from the transition metal compound (1) through the mixing in the step (a).

Among the nitrogen-containing molecular group, more preferable are amino groups, imine groups, amide groups, pyrrole rings, pyridine rings, and pyrazine rings, and more preferable are amino groups, imine groups, pyrrole rings, and pyrazine rings. Particularly preferred are amino groups and pyrazine rings since they particularly enhance the activity of the supported catalyst metal, in other words, since the activity of the resultant composite catalyst is particularly enhanced.

Specific examples of the nitrogen-containing organic compound (2) (including no oxygen atom) include melamine, ethylenediamine, triazole, acetonitrile, acrylonitrile, ethyleneimine, aniline, pyrrole, and polyethyleneimine. They may be, if any, in a form of a corresponding salt. Among these, ethylenediamine and ethylenediamine•dihydrochloride are preferable since they enhance the activity of the supported catalyst metal, in other words, since the resultant composite catalyst has high activity.

Preferably, the nitrogen-containing organic compound (2) has a hydroxyl group, a carboxyl group, an aldehyde group, an acid halide group, a sulfo group, a phosphoric acid group, a ketone group, a ether group, or an ester group (these are collectively referred to also as an "oxygen-containing molecular group"). The present inventors assume that the nitrogen-containing organic compound (2), in the case it the oxygen-containing molecular group in its molecule, is able to more strongly coordinated to a metal atom derived from the transition metal compound (1) through the mixing in the step (a).

Among the oxygen-containing molecular group, carboxyl groups and aldehyde groups are particularly preferable since they particularly enhance the activity of the supported catalyst metal, in other words, since the activity of the resultant composite catalyst is particularly enhanced.

The nitrogen-containing organic compounds (2) including an oxygen atom in its molecule are preferably compounds having the nitrogen-containing molecular group and the oxygen-containing molecular group. The present inventors assume that such compounds are able to be particularly strongly coordinated to a metal atom derived from the transition metal compound (1) through the step (a).

The compounds having the nitrogen-containing molecular group and the oxygen-containing molecular group are preferably amino acids having an amino group and a carboxyl group, and derivatives thereof.

The amino acids are preferably alanine, arginine, asparagine, asparagine acid, cysteine, glutamine, glutamic acid, glycine, histidine, isoleucine, leucine, lysine, methionine, phenylalanine, serine, threonine, tryptophan, tyrosine, valine, norvaline, glycylglycine, triglycine, and tetraglycine. Among them, alanine, glycine, lysine, methionine, and tyrosine are more preferable since they enhance the activity of the supported catalyst metal, in other words, since the resultant composite catalyst has high activity. In addition, alanine, glycine, and lysine are particularly preferable since they extremely enhance the activity of the supported catalyst metal, in other words, since the resultant composite catalyst exhibits extremely high activity.

Specific examples of the nitrogen-containing organic compound (2) containing an oxygen atom in its molecule include, in addition to the above amino acids and the like, acylpyrroles such as acetylpyrrole, pyrrolecarboxylic acid, acylimidazoles such as acetylimidazole, carbonyldiimidazole, imidazolecarboxylic acid, pyrazole, acetanilide, pyrazinecarboxylic acid, piperidinecarboxylic acid, piperazinecarboxylic acid, morpholine, pyrimidinecarboxylic acid, nicotinic acid, 2-pyridinecarboxylic acid, 2,4-pyridinedicarboxylic acid, 8-quinolinol, and polyvinylpyrrolidone. Since the activity of the supported catalyst metal is enhanced, in other words, since the resultant composite catalyst has high activity, among these compounds, preferable are those that can be a bidentate ligand. Specifically, preferable are pyrrole-2-carboxylic acid, imidazole-4-carboxylic acid, 2-pyrazinecarboxylic acid, 2-piperidinecarboxylic acid, 2-piperazinecarboxylic acid, nicotinic acid, 2-pyridinecarboxylic acid, 2,4-pyridinedicarboxylic acid, and 8-quinolinol, and more preferable are 2-pyrazinecarboxylic acid and 2-pyridinecarboxylic acid.

The ratio (B/A) of a total number B of carbon atoms of the nitrogen-containing organic compound (2) used in the step (a) to a total number A of atoms of metal elements of the transition metal compound (1) used in the step (a) is preferably 200 or less, more preferably 150 or less, still more preferably 80 or less, and particularly preferably 30 or less, from the viewpoint of allowing the reduction of components detaching as carbon compounds such as carbon dioxide and carbon monoxide in the thermal treatment of the step (c), that is, from the viewpoint of allowing the reduction of emission gas during the production of a thermally treated product capable of serving as a catalyst carrier. In addition, from the viewpoint of enhancing the activity of a supported catalyst metal, in other words, from the viewpoint of obtaining a composite catalyst having high activity, the ratio (B/A) is preferably 1 or more, more preferably 2 or more, still more preferably 3 or more, and particularly preferably 5 or more.

The ratio (C/A) of a total number C of nitrogen atoms of the nitrogen-containing organic compound (2) used in the step (a) to the total number A of atoms of metal elements of the transition metal compound (1) used in the step (a) is, from the viewpoint of obtaining a composite catalyst having high activity, preferably 28 or less, more preferably 17 or less, still more preferably 12 or less, and particularly preferably 8.5 or less. In addition, from the viewpoint of enhancing the activity of the supported catalyst metal, in other words, from the viewpoint of obtaining a composite catalyst having high activity, the ratio (C/A) is preferably 1 or more, more preferably 2.5 or more, still more preferably 3 or more, and particularly preferably 3.5 or more.

When the ratio of the first transition metal compound and the second transition metal compound used in the step (a) is represented as $M1:M2=(1-a'):a'$ in terms of a mole ratio (M1:M2) of atoms of the transition metal element M1 and the transition metal element M2, the range of $a'$ is preferably $0.01 \leq a' \leq 0.5$, more preferably $0.02 \leq a' \leq 0.4$, and particularly preferably $0.05 \leq a' \leq 0.3$.

<Solvent>

Examples of the solvent include water, alcohols, and acids. Preferable alcohols are ethanol, methanol, butanol, propanol, and ethoxyethanol, and more preferable alcohols are ethanol and methanol. Preferable acids are acetic acid, nitric acid, hydrochloric acid, aqueous phosphoric acid solution, and aqueous citric acid solution, and more preferable acids are acetic acid and nitric acid. Any one of these may be used alone or a combination of two or more thereof may be used.

When the transition metal compound (1) is a metal halide, the solvent is preferably methanol.

<Precipitation Suppressant>

When the transition metal compound (1) contains a halogen atom, such as in titanium chloride, niobium chloride, zirconium chloride, or tantalum chloride, these compounds are, in general, easily hydrolyzed with water to tend to cause precipitation of a hydroxide, an oxychloride, or the like. Accordingly, in the case of the transition metal compound (1) containing a halogen atom, it is preferable to add 1% by weight or more of a strong acid. For example, if the acid is a hydrochloric acid, by adding the acid such that a hydrogen chloride concentration in the solution is 5% by weight or more, and more preferably 10% by weight or more, a transparent thermally treated product precursor solution, namely, a transparent catalyst carrier precursor solution can be obtained while suppressing the occurrence of a precipitation derived from the transition metal compound (1).

Also when the transition metal compound (1) is a metal complex and water is used alone or in combination with other compound(s) as the above solvent, a precipitation suppressant is preferably used. The precipitation suppressant used in this case is preferably a compound having a diketone structure, and more preferably diacetyl, acetylacetone, 2,5-hexanedione, or dimedone, and still more preferably, acetylacetone or 2,5-hexanedione.

The precipitation suppressant is added in an amount of preferably 1 to 70% by weight, more preferably 2 to 50% by weight, and still more preferably 15 to 40% by weight, in 100% by weight of a metal compound solution (a solution that contains the transition metal compound (1) and does not contain the nitrogen-containing organic compound (2)).

The precipitation suppressant is added in an amount of preferably 0.1 to 40% by weight, more preferably 0.5 to 20% by weight, still more preferably 2 to 10% by weight in 100% by weight of the thermally treated product precursor solution.

The precipitation suppressant may be added in any stage of the step (a).

In the step (a), preferably, a solution containing the transition metal compound (1) and the precipitation suppressant is prepared, and then the solution is mixed with the nitrogen-containing organic compound (2) to give a thermally treated product precursor solution, namely, a catalyst carrier precursor solution. In addition, when the first transition metal compound and the second transition metal compound are used as the transition metal compound (1), in the step (a), preferably, a solution containing the first transition metal compound and the precipitation suppressant is prepared, and then the solution is mixed with the nitrogen-containing organic compound (2) and the second transition metal compound, to give a thermally treated product precursor solution, namely, a catalyst carrier precursor solution. Performing the step (a) in such a manner as described above can further ensure the suppression of occurrence of the precipitation.

(Step (b))

In the step (b), the solvent is removed from the thermally treated product precursor solution obtained in the step (a), namely, the catalyst carrier precursor solution.

The removal of the solvent may be performed under atmospheric conditions, or under an inert gas (for example, nitrogen, argon, or helium) atmosphere. The inert gas is, from the viewpoint of cost, preferably nitrogen or argon, and more preferably nitrogen.

The temperature during the removal of the solvent may be room temperature if the solvent has a large vapor pressure. However, from the viewpoint of mass productivity of the thermally treated product that can serve as a catalyst carrier, the temperature is preferably 30° C. or higher, more preferably 40° C. or higher, and still more preferably 50° C. or higher. From the viewpoint of preventing from decomposition of a thermally treated product precursor presumed to be a metal complex, such as a chelate, namely, a catalyst carrier precursor, contained in the solution obtained in the step (a), the temperature is preferably 250° C. or lower, more preferably 150° C. or lower, and still more preferably 110° C. or lower.

The solvent may be removed under atmospheric pressure when the solvent has a large vapor pressure. However, to remove the solvent in a shorter time, the removal of the solvent may be performed under reduced pressure (for example, at 0.1 Pa to 0.1 MPa). To remove the solvent under reduced pressure, for example, an evaporator can be used.

The solvent may be removed in a state in which the mixture product obtained in the step (a) is allowed to stand. However, to obtain a more uniform solid residue, it is preferable to remove the solvent while rotating the mixture product.

If the container containing the mixture product weighs much, it is preferable to rotate the solution using a stirring rod, a stirring blade, a stirring bar, or the like.

In addition, in a case of removing the solvent while adjusting a vacuum degree of the container containing the mixture product, dying is performed in a tightly closable container. Thus, preferably, the solvent is removed while rotating the entire container, for example, using a rotary evaporator.

Depending on the method for removing the solvent or the properties of the transition metal compound (1) or the nitrogen-containing organic compound (2), the composition or aggregation state of the solid residue obtained in the step (b) is sometimes nonuniform. In such a case, by using, in the step (c) described below, a more uniform, micro powder obtained by mixing and disintegrating the solid residue, there can be produced a thermally treated product having a more uniform particle size, namely, a catalyst carrier having a more uniform particle size.

The solid residue can be mixed and disintegrated, for example, using a roll-rotating mill, a ball mill, a small-diameter ball mill (bead mill), a medium-stirring mill, a gas flow pulverizer, a mortar, an automatic kneading mortar, a disintegrating tank, or a jet mill. In a case of a small amount of the solid residue, preferably, a mortar, an automatic kneading mortar, or a batch-type ball mill is used. When the solid residue is in large amount and the mixing and disintegration treatment is continuously performed, a jet mill is preferably used.

(Step (c))

In the step (c), the solid residue obtained in the step (b) is subjected to thermal treatment to give a thermally treated product. That is, in the process for producing a catalyst carrier of the present invention, the step (c) allows the production of a catalyst carrier in a form of the thermally treated product.

The temperature during the thermal treatment is 500 to 1100° C., preferably 600 to 1050° C., and more preferably 700 to 950° C.

If the temperature of the thermal treatment is too higher than the above range, sintering or particle growth occurs between particles of the obtained thermally treated product, resulting in reduction of a specific surface area of the thermally treated product. Accordingly, when a catalyst metal is supported on the particles, deterioration may be caused in processability in the processing of the particles into a catalyst layer by coating, in other words, processability in the processing of a composite catalyst containing the particles and the catalyst metal into a catalyst layer by coating. Meanwhile, if the temperature of the thermal treatment is too lower than the above range, the activity of the supported catalyst metal may not be sufficiently enhanced; in other words, a composite catalyst having high activity may not be obtained.

Examples of methods for the thermal treatment include a standing method, a stirring method, a dropping method, and a powder capturing method.

The standing method is a method in which the solid residue obtained in the step (b) is placed in a stationary electric furnace or the like to be heated. When heating is performed, the solid residue weighed out may be placed in a ceramic container made of an alumina board, a quartz board, or the like. The standing method is preferable in that a large amount of the solid residue can be heated.

The stirring method is a method in which the solid residue is placed in an electric furnace such as a rotary kiln to be heated while being stirred. The stirring method is preferable in that a large amount of the solid residue can be heated and the aggregation and growth of the particles of the resultant thermally treated product can be suppressed. Furthermore, the stirring method is preferable also in that a thermally treated product that can serve as a catalyst carrier can be continuously produced by tilting a heating furnace.

In the dropping method, while allowing an atmosphere gas to flow in an induction furnace, the furnace is heated up to a predetermined heating temperature to maintain a thermal balance at the temperature, and then the solid residue is dropped and heated in a crucible as a heating section of the furnace. The dropping method is preferable in that the aggregation and growth of the particles of the resultant thermally treated product can be suppressed to a minimum.

In the powder capturing method, droplets of the solid residue are allowed to float in an inert gas atmosphere containing a trace of oxygen gas and then the floating residue is captured into a vertical tubular furnace maintained at a predetermined heating temperature and heated.

When performing the thermal treatment by the standing method, the temperature increase speed is not particularly limited, but preferably approximately 1 to 100° C./minute, and more preferably 5 to 50° C./minute. In addition, the heating time is preferably 0.1 to 10 hours, more preferably 0.5 to 5 hours, and still more preferably 0.5 to 3 hours. In the standing method, when heating is performed in a tubular furnace, the time for heating the particles of the thermally treated product is 0.1 to 10 hours, and preferably 0.5 to 5 hours. When the heating time is in the above range, the particles of the thermally treated product tend to be uniformly formed.

In the case of the stirring method, the heating time for the solid residue is usually 10 minutes to 5 hours, and preferably 30 minutes to 2 hours. In the stirring method, when heating is continuously performed by tilting the furnace or the like, an average detention time calculated from a constant sample flow rate in the furnace is defined as the heating time.

In the case of the dropping method, the heating time for the solid residue is usually 0.5 to 10 minutes, and preferably 0.5 to 3 minutes. When the heating time is in the above range, the thermally treated product tends to be uniformly formed.

In the case of the powder capturing method, the heating time for the solid residue is 0.2 seconds to 1 minute, and preferably 0.2 to 10 seconds. When the heating time is in the above range, the thermally treated product tends to be uniformly formed.

When performing the thermal treatment by the standing method, a thermal treatment apparatus used may be a heating furnace in which LNG (liquefied natural gas), LPG (liquefied petroleum gas), light oil, heavy oil, electricity, or the like is used as a heat source. In this case, since the atmosphere during the thermal treatment of the solid residue is important in the present invention, preferred is an apparatus for heating from outside the furnace, not an apparatus for heating inside the furnace in which the flame of fuel is present in the furnace.

When using a heating furnace in which the amount of the solid residue is 50 kg or more per batch, a heating furnace in which LNG or LPG is used as a heat source is preferable from the viewpoint of cost.

When it is desired to produce a thermally treated product which achieves a composite catalyst having particularly high catalytic performance, namely, a catalyst carrier which particularly enhances the activity of a supported catalyst metal, it is desirable to use an electric furnace in which electricity is used as a heat source, which furnace allows strict temperature control.

Examples of shape of the furnace include a tubular furnace, a top cover furnace, a tunnel furnace, a box furnace, a sample stage elevation-type furnace (elevator furnace), and a bogie hearth furnace. Among them, preferred are a tubular furnace, a top cover furnace, a box furnace, and a sample stage elevation type furnace that allow particularly strict atmosphere control, and a tubular furnace and a box furnace are preferred.

Also in the case of using the stirring method, the above heat sources can be used. In the stirring method, particularly when using a tilting rotary kiln to continuously perform the thermal treatment of the solid residue, the size of the equipment is large and thus the energy use tends to increase, so that it is preferable to utilize a heat source derived from a fuel such as LPG.

The atmosphere during the thermal treatment is preferably an atmosphere containing an inert gas as a main component, from the viewpoint of enhancing the activity of a supported catalyst metal, in other words, from the viewpoint of enhancing the activity of a composite catalyst including the resultant thermally treated product and the catalyst metal. Among inert gases, from the viewpoint of being relatively inexpensive and easily available, nitrogen, argon, and helium are preferable, and nitrogen and argon are more preferable. These inert gases may be used alone or in combination of two or more kinds thereof. These gases are commonly thought to be inert. However, in the thermal treatment of the step (c), these inert gases, such as nitrogen, argon, and helium, are possibly reactive to the solid residue.

In addition, the presence of a reactive gas in the atmosphere of the thermal treatment can further enhance the performance when a catalyst metal is supported on an obtained catalyst carrier, in other words, can bring higher catalytic performance to a composite catalyst including the obtained thermally treated product and the catalyst metal. For example, if the thermal treatment is performed in the atmosphere of a nitrogen gas, an argon gas, a mixed gas of a nitrogen gas and an argon gas, or a mixed gas of at least one gas selected from a nitrogen gas and an argon gas and at least one gas selected from a hydrogen gas, an ammonia gas, and an oxygen gas, an electrode catalyst may be obtainable that has high catalytic performance when a catalyst metal is supported on an obtained catalyst carrier. From another viewpoint, if the thermal treatment is performed under such an atmosphere, the composite catalyst including an obtained thermally treated product can have high catalytic performance.

When the atmosphere of the thermal treatment contains a hydrogen gas, the concentration of the hydrogen gas is, for example, 100% by volume or less, preferably 0.01 to 10% by volume, and more preferably 1 to 5% by volume.

When the atmosphere of the thermal treatment contains an oxygen gas, the concentration of the oxygen gas is, for example, 0.01 to 10% by volume, and preferably 0.01 to 5% by volume.

Additionally, when none of the transition metal compound (1), the nitrogen-containing organic compound (2), and the solvent contain any oxygen atom, the thermal treatment is performed preferably in an oxygen gas-containing atmosphere.

After the thermal treatment, the thermally treated product may be disintegrated. Performing the disintegration may be able to improve processability in the production of an electrode using a supported catalyst obtained by supporting a catalyst metal on a catalyst carrier where the obtained thermally treated product is used as the catalyst carrier, namely, a composite catalyst including the obtained thermally treated product and the catalyst metal, and characteristics of the produced electrode. The disintegration may be performed using a roll-rotating mill, a ball mill, a small-diameter ball mill (bead mill), a medium-stirring mill, a gas flow pulverizer, a mortar, an automatic kneading mortar, a disintegration tank, or a jet mill. In the case of a small amount of the electrode catalyst, preferred are a mortar, an automatic kneading mortar, and a batch type ball mill. When the thermally treated product is continuously treated in large amount, preferred area jet mill and a continuous type ball mill, and among continuous type ball mills, a bead mill is more preferred.

<Thermally Treated Product>

The above-described thermally treated product is not only a component constituting the composite catalyst of the present invention, along with the catalyst metal, but also has a role of further enhancing the activity of the composite catalyst due to a synergetic effect on the catalyst metal. In the present invention, the thermally treated product can serve as a catalyst carrier.

When the ratio of the numbers of atoms of the transition metal element (in which the transition metal element M1 and the transition metal element M2 are not distinguished from each other), carbon, nitrogen, and oxygen that constitute the thermally treated product is represented as transition metal element:carbon:nitrogen:oxygen=1:x:y:z, the followings are preferably satisfied: $0 < x \leq 7$, $0 < y \leq 2$, and $0 < z \leq 3$.

From the viewpoint of enhancing the activity of the supported catalyst metal, in other words, from the viewpoint of enhancing the activity of the composite catalyst, the range of x is more preferably $0.15 \leq x \leq 5.0$, still more preferably $0.2 \leq x \leq 4.0$, and particularly preferably $1.0 \leq x \leq 3.0$; the range of y is more preferably $0.01 \leq y \leq 1.5$, still more preferably $0.02 \leq y \leq 0.5$, and particularly preferably $0.03 \leq y \leq 0.4$; and the range of "z" is more preferably $0.6 \leq z \leq 2.6$, still more preferably $0.9 \leq z \leq 2.0$, and particularly preferably $1.3 \leq z \leq 1.9$.

In addition, in the case in which the thermally treated product includes, as the transition metal element, one transition metal element M1 selected from the group consisting of the group 4 and the group 5 elements of the periodic table and at least one transition metal element M2 selected from iron, nickel, chromium, cobalt, vanadium, and manganese, when the ratio of the numbers of atoms of the transition metal element (M1), the transition metal element (M2), carbon, nitrogen, and oxygen that constitute the thermally treated product is represented as transition metal element M1:transition metal element M2:carbon:nitrogen:oxygen=(1-a):a:x:y:z, the followings are preferably satisfied: $0 < a \leq 0.5$, $0 < x \leq 7$, $0 < y \leq 2$, and $0 < z \leq 3$. By using the thermally treated product including the M2 as a catalyst carrier as described above, the activity of the supported catalyst metal can be further enhanced. In other words, the composite catalyst including the M2-containing thermally treated product as above has higher performance.

From the viewpoint of enhancing the activity of the supported catalyst metal, in other words, from the viewpoint of enhancing the activity of the composite catalyst, the preferable ranges of "x", "y", and "z" are as described above. The range of "a" is more preferably $0.01 \leq a \leq 0.5$, still more preferably $0.02 \leq a \leq 0.4$, and particularly preferably $0.05 \leq a \leq 0.3$. When the proportions of the respective elements are within the above ranges, the potential of oxygen reduction tends to be high, which is preferable.

Values of the "a", "x", "y", and "z" are those obtained when measured by a method employed in Examples described below.

Effects expected due to the presence of the transition metal element (M2) (at least one metal element selected from iron, nickel, chromium, cobalt, vanadium, and manganese) are presumed as follows:

(1) The transition metal element (M2) or a compound that contains the transition metal element (M2) acts as a catalyst for forming a bond between the transition metal element (M1) atom and a nitrogen atom in the synthesis of the thermally treated product.

(2) Even in the case the electrode catalyst is used at such a high potential and under such a highly oxidative atmosphere as to cause the elution of the transition metal element M1, the transition metal element (M2) is passivated to prevent further elution of the transition metal element M1.

(3) In the thermal treatment of the step (c), sintering of the thermally treated product is prevented.

(4) Due to the presences of the transition metal element M1 and the transition metal element M2, a bias of electric charge occurs in a region where both metal elements are adjacent to each other, thereby causing the adsorption or reaction of a reactant or the elimination of a product, which cannot be achieved by a thermally treated product containing only the transition metal element M1 as the metal element.

Preferably, the thermally treated product used in the present invention contains a transition metal element atom, a carbon atom, a nitrogen atom, and an oxygen atom and has a crystalline structure of an oxide, a carbide, or a nitride alone of the transition metal element or crystalline structures of plural ones thereof. Judging from the result of a crystalline structure analysis by a powder X-ray diffraction analysis of the thermally treated product and the result of element analysis, it is presumed that the thermally treated product has an oxide structure of the transition metal element in which an oxygen atom site of the oxide structure has been substituted with a carbon atom or a nitrogen atom; has a carbide, nitride, or carbonitride structure of the transition metal element in which a carbon atom site or a nitrogen atom site of the structure has been substituted with an oxygen atom; or is a mixture containing these structures.

<BET Specific Surface Area of Thermally Treated Product>

The thermally treated product obtained by the above step has a large specific surface area. The specific surface area thereof calculated by a BET method is preferably 30 to 400 $m^2/g$, more preferably 50 to 350 $m^2/g$, and still more preferably 100 to 300 $m^2/g$.

(Step (d))

In the step (d), a composite catalyst including the thermally treated product and the catalyst metal is obtained. When considering the step (d) based on the process for producing a catalyst carrier of the present invention, the step (d) can be regarded also as a step for supporting the catalyst metal on the catalyst carrier produced by the catalyst carrier production process of the present invention to give a supported catalyst.

As used herein, the catalyst metal, which, along with the thermally treated product, constitutes the composite catalyst, in other words, the catalyst metal supported on the catalyst carrier is not particularly limited as long as it is a catalyst metal capable of serving as a fuel cell electrode catalyst. Examples of suitable catalyst metals include platinum, gold, silver, copper, palladium, rhodium, ruthenium, iridium, osmium, and rhenium. These catalyst metals may be used alone or in combination of two or more thereof. Alternatively, the catalyst metal may be an alloy of two or more thereof or an alloy of the transition metal element M1 and the transition metal element M2. Furthermore, when the composite catalyst or the supported catalyst obtained in the present invention is used for a direct methanol type fuel cell, use of palladium or a palladium alloy as a catalyst metal can suitably suppress cathode performance reduction due to methanol crossover.

The process for obtaining the composite catalyst including the thermally treated product and the catalyst metal, in other words, the process for supporting the catalyst metal on the catalyst carrier is not particularly limited as long as the composite catalyst is obtainable in a practically usable manner. A suitable process is to use a catalyst metal precursor to give the composite catalyst of the present invention, in other words, to use a catalyst metal precursor to support the catalyst metal. As used herein, the catalyst metal precursor is a substance that can be the catalyst metal by a predetermined treatment.

The process for obtaining the composite catalyst of the present invention using the catalyst metal precursor, in other words, the process for supporting the catalyst metal precursor on the catalyst carrier is not particularly limited, and a process using any conventionally known technique can be utilized. Examples of the process include:

(1) a process including a step of dispersing the thermally treated product in a catalyst metal precursor solution and evaporating the resultant dispersion solution to dryness and a step of applying heating treatment after that;

(2) a process including a step of dispersing the thermally treated product in a catalyst metal precursor colloid solution and allowing the catalyst metal precursor colloid to be adsorbed on the thermally treated product to support the catalyst metal on the thermally treated product; and (3) a process including a step of adjusting the pH of a mixed solution of a solution containing at least one metal compound that is a raw material of a thermally treated product precursor and a catalyst precursor colloid solution to give a thermally treated product precursor and simultaneously allow the catalyst precursor colloid to be adsorbed thereon and a step of performing a thermal treatment of them, although not limited thereto at all.

As used herein, the catalyst metal precursor solution can be any as long as the catalyst metal as described above can be produced through the respective stages above (i.e. the catalyst metal can be left after the thermal treatment). In addition, the content of the catalyst metal precursor in the catalyst metal precursor solution is not particularly limited and can be any amount as long as the content thereof is at a saturation concentration or lower. However, in a case of low concentration, adjustments are needed to be made by repeating the above stages until a desired amount of support or introduction is obtained, so that necessary concentration is determined according to the need. The content of the catalyst metal precursor in the catalyst metal precursor solution is approximately 0.01 to 50% by weight, although not limited thereto.

In a particularly suitable embodiment, the step (d) includes the following steps (d1) to (d5):

(d1) a step of dispersing the thermally treated product in a solution set at 40 to 80° C. and adding a water-soluble catalyst metal compound to impregnate the water-soluble catalyst metal compound with the thermally treated product;

(d2) a step of adding an aqueous basic compound solution to the solution obtained in the step (d1) to convert the water-soluble catalyst metal compound into a water-insoluble catalyst metal compound;

(d3) a step of adding a reducing agent to the solution obtained in the step (d2) to reduce the water-insoluble catalyst metal compound to a catalyst metal;

(d4) a step of filtering the solution obtained in the step (d3) and then washing and drying the residue; and (d5) a step of thermally treating the powder product obtained in the step (d4) at 150 to 1000° C.

As used herein, examples of the water-soluble catalyst metal compound include oxides, hydroxides, chlorides, sulfides, bromides, nitrates, acetates, carbonates, sulfates, and various complex salts of a catalyst metal. Specific examples thereof include chloroplatinic acid, dinitrodiammine platinum, iridium chloride, silver nitrate, palladium chloride, and tetraamminepalladium(II) chloride, although not limited thereto. These water-soluble catalyst metal compounds may be used alone or in combination of two or more thereof.

In the step (d1), the solvent constituting the above solution is not particularly limited as long as it serves as a medium that allows dispersion and support or dispersion and impregnation of the catalyst metal on the thermally treated product, but usually, water and alcohols are suitably used. The alcohols are preferably ethanol, methanol, butanol, propanol, and ethoxyethanol, among which ethanol and methanol are more preferable. These may be used alone or in combination of two or more thereof. In addition, the content of the water-soluble catalyst metal compound in this solution is not particularly limited and can be any amount as long as it is at a saturation concentration or lower. A specific content of the water-soluble catalyst metal compound is approximately 0.01 to 50% by weight, although not limited thereto. Additionally, the time for impregnating the water-soluble catalyst metal compound in the thermally treated product is not particularly limited, but is preferably 10 minutes to 12 hours, more preferably 30 minutes to 6 hours, and still more preferably 1 to 3 hours.

In the step (d2), the basic compound constituting the aqueous basic compound solution is not particularly limited as long as it can convert the water-soluble catalyst metal compound into a water-insoluble catalyst metal compound. Examples of suitable basic compounds include sodium hydroxide, sodium carbonate, potassium hydroxide, potassium carbonate, calcium hydroxide, and calcium carbonate.

The reducing agent used in the step (d3) is not particularly limited as long as it can reduce the water-insoluble catalyst metal compound to a catalyst metal. Examples of suitable reducing agents include aqueous formaldehyde solution, sodium borohydride, hydrazine, ethylene glycol, ethylene, and propylene. In the step (d3), after adding the reducing agent, stirring is performed at 40 to 80° C. to reduce the water-insoluble catalyst metal compound to the catalyst metal. The time for the stirring is not particularly limited, but is preferably 10 minutes to 6 hours, more preferably 30 minutes to 3 hours, and still more preferably 1 to 2 hours.

In the step (d4), conditions for the filtering are not particularly limited, but it is preferable to perform the filtering until the pH of the solution after washing is 8 or lower. The drying is performed at 40 to 80° C. in the air or under an inert atmosphere.

The thermal treatment in the step (d5) can be performed, for example, in a gaseous atmosphere containing nitrogen and/or argon. Alternatively, the thermal treatment can be done in a gaseous atmosphere obtained by mixing, into the above gas, hydrogen in an amount of from more than 0 to 5% by volume with respect to a total amount of gas. The temperature for the thermal treatment is preferably in a range of 300 to 1100° C., more preferably in a range of 500 to 1000° C., and still more preferably in a range of 700 to 900° C.

As an example of a more specific process in which platinum is used as a catalyst metal, for example, a process is provided as follows:

A thermally treated product was added to distilled water and the mixture was shaken by an ultrasonic washing machine for 30 minutes. While stirring the resultant suspension on a hot plate to maintain the solution temperature at 80° C., sodium carbonate is added thereto.

An aqueous chloroplatinic acid solution provided in advance is added to the suspension over 30 minutes. Then, the suspension is stirred at the solution temperature of 80° C. for 2 hours.

Next, a 37% aqueous formaldehyde solution is slowly added to the suspension. After that, the suspension is stirred at the solution temperature of 80° C. for 1 hour.

After completion of the reaction, the resultant suspension is cooled down and filtered.

The obtained powder is subjected to thermal treatment at 800° C. for 1 hour in a 4% by volume hydrogen-containing nitrogen atmosphere to give a platinum-containing composite catalyst that is the composite catalyst of the present invention. The platinum-containing composite catalyst can be regarded also as a platinum supported catalyst that is the supported catalyst of the present invention, based on the process for producing a catalyst carrier of the present invention.

After going through the step (d), a composite catalyst is obtained that is used for a fuel cell electrode. In a suitable embodiment of the present invention, the proportion of the catalyst metal with respect to a total weight of the composite catalyst is 0.01 to 50% by weight.

In addition, as a process in which palladium is used as a catalyst metal for use in a direct methanol type fuel cell, for example, the following process is provided:

First, the thermally treated product is added to distilled water and the mixture is shaken by an ultrasonic washing machine for 30 minutes. While stirring the resultant suspension on a hot plate, the solution temperature is maintained at 80° C.

Next, an aqueous palladium chloride solution provided in advance is added to the suspension over 30 minutes, and then, the suspension is stirred for 2 hours at the solution temperature of 80° C. After that, 1M sodium hydroxide is slowly added until the pH of the suspension is 11, and then 1M sodium borohydride is slowly added to the suspension up to such an amount that palladium is sufficiently reduced, followed by 1-hour stirring at the solution temperature of 80° C. After completing the reaction, the above suspension is cooled down and filtered.

The resultant powder is subjected to thermal treatment at 300° C. for 1 hour in a 4% by volume hydrogen-containing nitrogen atmosphere to give a palladium-containing composite catalyst as the composite catalyst of the present invention.

After going through the step (d), a composite catalyst is obtained that is used for a fuel cell electrode. In a suitable embodiment of the present invention, the proportion of the catalyst metal with respect to a total weight of the composite catalyst is 0.01 to 50% by weight.

<Composite Catalyst>

The composite catalyst of the present invention is produced by the process for producing a composite catalyst of the present invention described above. The composite catalyst can be regarded also as a supported catalyst of the present invention, based on a catalyst carrier obtained by the process for producing a catalyst carrier of the present invention.

As described below, the composite catalyst of the present invention can be suitably used as a fuel cell electrode catalyst.

According to the process for producing a composite catalyst of the present invention, a composite catalyst having a large specific surface area is produced. The specific surface area, calculated by a BET method, of the composite catalyst of the present invention is preferably 30 to 350 m$^2$/g, more preferably 50 to 300 m$^2$/g, and still more preferably 100 to 300 m$^2$/g.

An oxygen reduction onset potential of the composite catalyst measured according to a measurement method (A) described in the following Examples is preferably 0.9 V (vs. RHE) or higher, more preferably 0.95 V (vs. RHE) or higher, and still more preferably 1.0 V (vs. RHE) or higher with respect to a reversible hydrogen electrode.

In the composite catalyst of the present invention, effects expected due to the presences of a catalyst metal (platinum, gold, silver, copper, palladium, rhodium, ruthenium, iridium, osmium, and rhenium, or an alloy of two or more thereof), the transition metal element M1 (at least one metal element selected from the group consisting of titanium, zirconium, hafnium, niobium, tantalum, and vanadium), and the transition metal element M2 (at least one metal element selected from iron, nickel, chromium, cobalt, vanadium, and manganese) are presumed as follows:

(1) The thermally treated product constituting the composite catalyst acts as such a co-catalyst that causes the adsorption or reaction of a reactant or the elimination of a product, thereby enhancing a catalytic effect of the catalyst metal.

(2) The bias of electric charge occurs in a region where the dissimilar metals: the catalyst metal, the transition metal element M1, and the transition metal element M2 are adjacent to each other, thereby causing the adsorption or reaction of a reactant or the elimination of a product, which cannot be achieved by the individual metal alone.

[Intended Use]

The composite catalyst of the present invention can be suitably used as a fuel cell electrode catalyst.

A fuel cell catalyst layer of the present invention includes the composite catalyst obtained by the above steps. As used herein, although the composite catalyst can also be regarded as the supported catalyst of the present invention based on the catalyst carrier production process of the present invention, the term "composite catalyst" in the description hereinbelow will be used as a concept encompassing also "supported catalyst".

Fuel cell catalyst layers include an anode catalyst layer and a cathode catalyst layer. The composite catalyst can be used for either of the layers. The catalyst carrier obtained by the process for producing a catalyst carrier of the present invention enhances oxygen reduction performance of the supported catalyst metal and has properties that hardly cause corrosion even at high potential in an acidic electrolyte. That is, since the composite catalyst has high oxygen reduction performance and has properties that hardly cause corrosion even at high potential in an acidic electrolyte, the composite catalyst is preferably used for the cathode catalyst layer, particularly preferably for a catalyst layer provided on the cathode of a membrane electrode assembly incorporated in a solid polymer type fuel cell.

From an another viewpoint, the fuel cell catalyst layer of the present invention can be used for either anode catalyst layer or cathode catalyst layer, and is particularly suitably used for the cathode catalyst layer.

In the present specification, the anode catalyst layer and the cathode catalyst layer, respectively, may be abbreviated to be referred to as "anode" and "cathode", respectively.

The fuel cell catalyst layer of the present invention preferably further includes an electron conductive substance. When the fuel cell catalyst layer including the composite catalyst further includes an electron conductive substance, reduction current can be further increased. The present inventors assume that since the electron conductive substance produces an electrical contact point for inducing an electrochemical reaction in the composite catalyst, reduction current increases.

In the present invention, the electron conductive substance is usually used to support the composite catalyst. Although the composite catalyst has conductivity to some extent, carrier particles for providing conductivity may be mixed into the composite catalyst in order to give more electrons to the composite catalyst or to allow the reactant to receive many electrons from the composite catalyst. These carrier particles may be mixed into the composite catalyst produced through the steps (a) to (d) or mixed in any stage of the steps (a) to (d).

<Electron Conductive Material>

An electron conductive material used in the present invention is not particularly limited and examples of the material include carbons, conductive polymers, conductive ceramics, metals, and conductive inorganic oxides such as tungsten oxide and iridium oxide. These electron conductive materials may be used alone or in combination of two or more thereof. Particularly, conductive particles made of carbon are preferable, since they have a large specific surface area; those having a small particle size are available at low cost; and resistance to chemicals and resistance to high potential are excellent. When using such carbon conductive particles, preferred is carbon alone or a mixture of carbon and other conductive particles. That is, the fuel cell catalyst layer preferably includes the composite catalyst and carbon (particularly, carbon particles).

Examples of the carbon include carbon black, graphite, black lead, activated carbon, carbon nanotube, carbon nanofiber, carbon nanohorn, fullerene, porous carbon, and graphene. A particle diameter or fiber diameter of the electron conductive substance made of carbon is preferably in a range of 5 to 1000 nm and more preferably in a range of 10 to 100 nm, as measurement values measured by TEM observation. A carbon particle diameter of less than 10 nm tends to make it difficult to form an electron conduction path, and a carbon particle diameter exceeding the upper limit tends to degrade gas dispersibility of a formed fuel cell catalyst layer or decrease the electrode catalyst utilization rate. In addition, the electron conductive particles made of carbon have a BET specific surface area of preferably 50 to 3000 $m^2/g$, and more preferably 100 to 3000 $m^2/g$.

When the electron conductive substance is made of carbon, a weight ratio between the composite catalyst and the electron conductive substance (catalyst:electron conductive substance) is preferably 1:1 to 1000:1, more preferably 2:1 to 100:1, and still more preferably 4:1 to 10:1.

The conductive polymers are not particularly limited and examples of the conductive polymers include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline, polyphenylquinoxaline, and derivatives thereof. Among them, polypyrrole, polyaniline, and polythiophene are preferred, and polypyrrole is more preferred. These may contain a dopant for obtaining high conductivity.

<Proton Conductive Material>

The fuel cell catalyst layer preferably includes a polymer electrolyte as a proton conductive material. The proton conductive material used in the present invention is not particularly limited as long as it is one commonly used in fuel cell catalyst layers. Examples of the proton conductive material include perfluorocarbon polymers having a sulfonic acid group (such as NAFION (registered trademark)), hydrocarbon polymer compounds having a sulfonic acid group, polymer compounds doped with an inorganic acid such as phosphoric acid, organic/inorganic hybrid polymers partially substituted with a proton conductive functional group, and proton conductors composed of a polymer matrix impregnated with a phosphoric acid solution or a sulfuric acid solution. Among them, NAFION (registered trademark) is preferable. A preferable supply source for NAFION (registered trademark) in the formation of the fuel cell catalyst layer includes a 5% NAFION (registered trademark) solution (DE 521, manufactured by DuPont) is preferable. Alternatively, by using, as the proton conductive material, "FLEMION" membrane manufactured by Asahi Glass Co. Ltd., or "ACIPLEX" membrane manufactured by Asahi Kasei Corporation, reaction in fuel cell tends to be prompted even under high temperature and low humidity conditions.

<Solvent>

A solvent used in the present invention is not particularly limited and examples of the solvent include volatile organic solvents and water.

Specific examples of the solvent include alcohol solvents, ether solvents, aromatic solvents, aprotic polar solvents, and water. Among them, water, acetonitrile, alcohols having 1 to 4 carbon atoms are preferable. Specifically, preferred are methanol, ethanol, 1-propanol, 2-propanol, 1-butanol, 2-butanol, isobutanol, and t-butanol. Particularly preferred are water, acetonitrile, 1-propanol, and 2-propanol. These solvents may be used alone or in combination of two or more thereof.

<Process for Preparing Catalyst Ink>

A catalyst ink using the supported catalyst of the present invention is prepared, for example, by mixing the supported catalyst, the electron conductive material, the proton conductive material, and the solvent as described above. The order for mixing the supported catalyst, the electron conductive material, the proton conductive material, and the solvent is not particularly limited. For example, the supported catalyst, the electron conductive material, the proton conductive material, and the solvent may be sequentially or simultaneously mixed together to disperse the supported catalyst and the like in the solvent so as to allow the preparation of the ink. Alternatively, after preparing a solution in which a solid proton conductive material has been preliminarily mixed in water and/or an alcohol solvent such as methanol, ethanol, or propanol, the preliminarily mixed solution may be mixed with an electrode catalyst, an electron conductive material, and a solvent.

The time for the mixing can be arbitrarily determined according to the mixing means, dispersibility of the electrode catalyst and the like, volatility of the solvent, and the like.

As the mixing means, a stirrer such as homogenizer may be used, or a ball mill, a bead mill, an ultrasonic dispersion apparatus, a kneading and defoaming apparatus, or the like may be used. Alternatively, these means may be combined together. Among them, preferred is a mixing means using an ultrasonic dispersion apparatus, a homogenizer, a ball mill, or a kneading and defoaming apparatus. In addition, if needed, the mixing may be performed using a mechanism, device, or the like for maintaining the temperature of the ink in a constant range.

Examples of a method for dispersing the composite catalyst on the electron conductive substance include airflow dispersion and in-liquid dispersion. The in-liquid dispersion is preferable since a product obtained by dispersing the composite catalyst and an electron conductive substance in a solvent can be used in a fuel cell catalyst layer forming step. Examples of the in-liquid dispersion include a method using orifice contractile flow, a method using rotating shear flow, and a method using ultrasonic wave. In the in-liquid dispersion, the solvent to be used is not particularly limited as long as it allows dispersion without corroding the composite catalyst and the electron conductive substance. In general, a volatile liquid organic solvent, water, or the like is used.

In addition, when dispersing the composite catalyst on the electron conductive substance, the electrolyte and a dispersant may be additionally dispersed simultaneously.

<Electrode Catalyst Layer>

An electrode catalyst layer using the supported catalyst of the present invention is formed by using the ink described above. The electrode catalyst layer formed with the catalyst ink is excellent in durability and has high catalytic performance.

The method for forming the electrode catalyst layer is not particularly limited, and an example of such a method includes a method in which the catalyst ink (suspension) including the composite catalyst, an electron conductive substance, and an electrolyte is coated on an electrolyte membrane and/or a gas diffusion layer described below and then dried to form the electrode catalyst layer. Alternatively, another example includes a method in which the catalyst ink is coated on a transfer base material and dried to form an electrode catalyst layer on the transfer base material, and then, using a transfer method, the electrode catalyst layer is formed on an electrolyte membrane and/or a gas diffusion layer.

Examples of the coating method include a dipping method, a screen printing method, a roll coating method, a spraying method, a bar coater method, and a doctor blade method. In addition, another example includes a method in which the catalyst ink (suspension) including the composite catalyst, an electron conductive substance, and an electrolyte is coated on a base material by a coating method or a filtering method to form a fuel cell catalyst layer on a substrate and then, using a transfer method, the fuel cell catalyst layer is formed on an electrolyte membrane.

The method for the drying is not particularly limited, and examples of the drying method include natural drying and heating by a heater.

In the case of heating, the heating temperature is preferably 30 to 120° C., more preferably 40 to 110° C., and still more preferably 45 to 100° C.

The coating and the drying may be simultaneously performed. In this case, preferably, the drying is completed immediately after the coating by adjusting the coating amount and the drying temperature.

Regarding a composition of the catalyst ink in the formation of the electrode catalyst layer, a mass ratio (A/B) between a content A of the supported catalyst and a content B of the electron conductive material is from 1 to 6, preferably from 1.5 to 5.5, and more preferably from 2 to 5. An electrode catalyst layer formed with a catalyst ink having a mass ratio in the above range tends to have high catalytic performance.

Additionally, a mass ratio (D/C) between a total content C of the supported catalyst and the electron conductive material and a content D of the proton conductive material is from 0.1 to 0.9, preferably from 0.15 to 0.8, and more preferably from 0.2 to 0.7.

An electrode catalyst layer formed with a catalyst ink having the mass ratio (A/B) and the mass ratio (D/C) in the above ranges is excellent in durability and has high catalytic performance.

<Gas Diffusion Layer>

An electrode of the present invention has the fuel cell catalyst layer and a porous support layer.

The porous support layer is a layer diffusing gas (hereinafter referred to also as "gas diffusion layer"). The gas diffusion layer can be any as long as it has electron conductivity, high gas diffusibility, and high corrosion resistance. In general, there are used a carbon porous material such as carbon paper or carbon cloth, stainless steel, or aluminium foil coated with a corrosion-resistant material due to weight reduction.

<Membrane Electrode Assembly>

A membrane electrode assembly of the present invention is a membrane electrode assembly having a cathode, an anode, and an electrolyte membrane interposed between the cathode wherein at least one of the cathode and the anode is the electrode. In this case, when only either one of the cathode and the anode is the electrode, as the other electrode, there can be used a conventionally known fuel cell electrode, for example, a fuel cell electrode including a platinum catalyst such as a platinum supported carbon instead of the composite catalyst.

Hereinafter, in the present specification, the membrane electrode assembly may be referred to as "MEA".

The membrane electrode assembly can be obtained by forming the electrode catalyst layer on an electrolyte membrane and/or a gas diffusion layer/gas diffusion layers and then sandwiching both surfaces of the electrolyte membrane by the gas diffusion layers with the catalyst layer inside and performing hot press.

The temperature for hot press is arbitrarily selected depending on components in the electrolyte membrane and/or the catalyst layer used, but is preferably 100 to 160° C., more preferably 120 to 160° C., and still more preferably 120 to 140° C. When the temperature for hot press is less than the above lower limit, bonding can be insufficient, whereas when the temperature therefor is more than the above upper limit, the components in the electrolyte membrane and/or the catalyst layer can be deteriorated.

The pressure for hot press is arbitrarily selected depending on the components in the electrolyte membrane and/or the catalyst layer and the kind of the gas diffusion layers, but is preferably 1 to 10 MPa, more preferably 1 to 6 MPa, and still more preferably 2 to 5 MPa. When the pressure for hot press is less than the lower limit, bonding can be insufficient, whereas when the pressure therefor exceeds the upper limit, porosities of the catalyst layer and the gas diffusion layers can decrease and thus performance can be degraded.

The time for hot press is arbitrarily selected depending on the temperature and the pressure for hot press, but is preferably 1 to 20 minutes, more preferably 3 to 20 minutes, and still more preferably 5 to 20 minutes.

A catalyst power generation performance in the membrane electrode assembly can be evaluated, for example, by current density at 0.75 V calculated as follows:

First, the membrane electrode assembly is held by sealing materials (gaskets), separators having a gas flow channel, and current collectors and fixed with a bolt to tighten them up so as to reach a predetermined contact surface pressure (4N), thereby producing a single cell of a solid polymer type fuel cell.

Hydrogen as a fuel is fed to the anode side at a flow rate of 1 L/min, and oxygen as an oxidizing agent is fed to the cathode side at a flow rate of 2 L/min. Under ordinary pressure, current-voltage characteristics at a single cell temperature of 90° C. are measured. From a curve of the obtained current-voltage characteristics, a current density (A/cm$^2$) at 0.75 V is calculated. Higher current density indicates the higher catalyst performance in the membrane electrode assembly.

As the electrolyte membrane, for example, a perfluorosulfonic acid-based electrolyte membrane, a hydrocarbon-based electrolyte membrane, or the like is commonly used. However, the electrolyte membrane may be a membrane formed by impregnating a polymer microporous membrane with a liquid electrolyte, a membrane formed by filling a polymer electrolyte in a porous medium, or the like.

In addition, a fuel cell of the present invention includes the membrane electrode assembly.

An electrode reaction in a fuel cell occurs in the so-called three-phase interface (electrolyte-electrode catalyst-reaction gas). The fuel cell is classified into several types according to the difference in electrolytes used or the like, such as molten carbonate fuel cell (MCFC), phosphoric acid fuel cell (PAFC), solid oxide fuel cell (SOFC), and solid polymer fuel cell (PEFC). Among them, the membrane electrode assembly of the present invention is preferably used in solid polymer type fuel cells.

A fuel cell using the composite catalyst of the present invention has higher performance and is much more inexpensive than a fuel cell using platinum alone as a catalyst, instead of the form of composite catalyst. The fuel cell of the present invention can improve performances of articles having at least one function selected from the group consisting of power generating function, light emitting function, heat generating function, acoustic generating function, movement function, display function, and charging function and provided with a fuel cell, particularly performances of portable articles. The fuel cell is preferably provided on surfaces of the articles or inside thereof.

<Specific Examples of Articles Provided with Fuel Cell of the Present Invention>

Specific examples of the articles that can be provided with the fuel cell of the present invention include architectural structures such as buildings, houses and tents, illumination equipment such as fluorescent light, LED, organic EL, street light, interior illumination, and traffic light, machinery, automotive equipment including vehicles themselves, household appliances, agricultural equipment, electronic devices, mobile information terminals including mobile phones, beauty instruments, portable tools, sanitary equipment such as bathroom articles, furniture, toys, ornaments, bulletin boards, cooler boxes, outdoor articles such as exterior generators, teaching materials, artificial flowers, artwork, power sources for cardiac pacemakers, and power sources for heating and cooling devices equipped with a Peltier device.

EXAMPLES

Hereinafter, the present invention will be described in more detail with reference to Examples, but is not limited thereto.

Additionally, various measurements in Examples and Comparative Examples were performed by the following methods.

[Analysis Methods]
1. Powder X-Ray Diffractometry
Samples were analyzed by powder X-ray diffractometry using ROTAFLEX manufactured by Rigaku Corporation.

The number of diffraction line peaks in the powder X-ray diffractometry for each sample was counted by assuming, as a single peak, a signal detectable when a signal (S)-to-noise (N) ratio (S/N) was 2 or more.

The borderline of the noise (N) was determined by the width of the baseline.

2. Elemental Analysis
Carbon: approximately 0.1 g of a sample was weighed out and analyzed by EMIA-110 manufactured by HORIBA, Ltd.

Nitrogen and oxygen: approximately 0.1 g of a sample was weighed out, sealed in a Ni cup, and then analyzed by an ON analyzer.

Transition metal element (such as titanium): approximately 0.1 g of a sample was weighed out onto a platinum dish. Then, an acid was added to the sample and the ample was subjected to thermal decomposition. The thermally decomposed product was fixed at a constant volume and then diluted for quantitative analysis by ICP-MS.

3. BET Specific Surface Area
0.15 g of a sample was collected and was subjected to measurement of specific surface area by a fully automatic BET specific surface area analyzer, MACSORB (manufactured by Mountech Co., Ltd). Pretreatment time and pretreatment temperature were set to 30 minutes and 200° C., respectively.

4. Catalytic Performance Evaluation
Half cell evaluation and single cell evaluation were performed by using the following measurement methods (A) and (B), respectively, unless otherwise specified.

[Measurement Method (A): Half-Cell Evaluation]
<<Production of Electrode>>

The composite catalyst and carbon, which is an electron conductive substance, are added in a solvent such that an amount of the composite catalyst dispersed in the carbon is 1% by mass, and the resultant mixture is ultrasonically stirred to give a suspension. The carbon used is carbon black (specific surface area: 100 to 300 m$^2$/g) (for example, XC-72 manufactured by Cabot Corporation) and is dispersed such that the mass ratio of composite catalyst to carbon is 95:5. In addition, the solvent used is a mixture of isopropyl alcohol:water (mass ratio)=2:1.

10 µL of the suspension is collected with ultrasonic wave applied to the suspension, then quickly dropped on a grassy carbon electrode (diameter: 5.2 mm), and dried at 120° C. for 5 minutes, whereby a fuel cell catalyst layer including the composite catalyst is formed on the grassy carbon electrode. The dropping and drying operation is repeated until 1.0 mg or more of a fuel cell catalyst layer is formed on the carbon electrode surface.

Next, 10 µL of a 10 fold dilution of 5% NAFION (registered trademark) (DE521 manufactured by DuPont) with isopropyl alcohol is additionally added dropwise onto the fuel cell catalyst layer and dried at 120° C. for 1 hour to produce a fuel cell electrode for half-cell evaluation.

<<Half-Cell Evaluation>>

A current-potential curve is measured by polarizing the electrode obtained by the above step in a 0.5 mol/L of aqueous sulfuric acid solution at 30° C. under an oxygen atmosphere and a nitrogen atmosphere at a potential scanning rate of 5 mV/sec, using, as a reference electrode, a reversible hydrogen electrode in a aqueous sulfuric acid solution having the same concentration. In the measurement, a potential at which a difference of 0.2 µA/cm$^2$ or more starts to appear between the reduction current under the oxygen atmosphere and that under the nitrogen atmosphere is defined as an oxygen reduction onset potential.

In the present invention, oxygen reduction current density can be obtained as follows:

First, based on a result of the above measurement method (A), calculation is made for a difference between the reduction current under the oxygen atmosphere and the reduction current under the nitrogen atmosphere at a specific potential, for example, at 0.90 V (vs. RHE). Additionally, the calculated value is divided by an area of the electrode to define the obtained value as an oxygen reduction current density (mA/cm$^2$).

[Measurement Method (B): Single Cell Evaluation]

<<Preparation of Catalyst Ink>>

To a mixed solvent of 25 ml of isopropyl alcohol (manufactured by Wako Pure Chemical Industries, Ltd.) and 25 ml of ion-exchange water were added 0.355 g of a supported catalyst and 0.089 g of carbon black (KETJENBLACK EC300J manufactured by LION Corporation) as an electron conductive material, and additionally, as a proton conductive material, 5.325 g of a 5% aqueous solution of NAFION (registered trademark) (manufactured by Wako Pure Chemical Industries, Ltd.), followed by mixing for 1 hour by using an ultrasonic disperser (UT-106H, manufactured by Sharp Manufacturing Systems Corporation), to give a cathode catalyst ink.

<<Production of Electrode Having Electrode Catalyst Layer>>

A gas diffusion layer (carbon paper (GDL 24BC, manufactured by SGL Carbon Group)) was formed into a size of 5 cm×5 cm and a surface of the gas diffusion layer (hereinafter described also as "GDL") was coated with the cathode catalyst ink at 80° C. by using an automatic spray coating machine (manufactured by San-Ei Tech Co., Ltd) to give an electrode having a cathode catalyst layer on the GDL surface (hereinafter referred to also as "cathode"). The coating of the catalyst ink was performed in such a manner that a noble metal weight per cm$^2$ of the electrode was 0.1 mg.

<<Production of Fuel Cell Membrane Electrode Assembly>>

There were provided NAFION (registered trademark) membrane (N-212, manufactured by DuPont) as an electrolyte membrane, the above cathode as a cathode electrode, and, as an anode electrode, an electrode having an anode catalyst layer (1) (hereinafter referred to also as "anode") produced in Reference Example 1, respectively. Between the cathode and the anode was arranged the electrode membrane to produce a fuel cell membrane electrode assembly (hereinafter referred to also as "MEA") as follows.

The electrolyte membrane was sandwiched between the cathode and the anode, and then, these were thermally compressed by a hot press machine at a temperature of 140° C. under a pressure of 3 MPa for 6 minutes such that the cathode catalyst layer and the anode catalyst layer tightly adhered to the electrolyte membrane, to give an MEA.

<<Production of Single Cell>>

The MEA was sandwiched by two sealing materials (gaskets), two separators with a gas flow channel, two current collectors, and two rubber heaters and fixed with a bolt to tighten them up so as to reach a predetermined contact surface pressure (4N), to give a single cell of a solid polymer type fuel cell (hereinafter referred to also as "single cell") (cell area: 25 cm$^2$).

<<Evaluation of Power Generation Characteristics (Measurement of Catalytic Power Generation Performance>>

Temperatures of the single cell, an anode humidifier, and a cathode humidifier were adjusted to 90° C., 90° C., and 50° C., respectively. Hydrogen as a fuel was fed to the anode at a flow rate of 1 L/minute and air as an oxidizing agent was fed to the cathode side at a flow rate of 2 L/minute to measure current-voltage characteristics in the single cell under ordinary pressure. From the obtained current-voltage characteristic curve, a current density at 0.75 V was calculated and the measurement results were indicated in Table 2. As the current density is higher, the catalytic power generation performance in the MEA is higher.

Reference Example 1

Production of Anode Electrode for Single Cell Evaluation (1)

1. Preparation of Anode Catalyst Ink

To 50 ml of pure water were added 0.6 g of a Pt-supporting carbon (TEC10E70TPM, manufactured by Tanaka Kikinzoku Kogyo K.K.) and additionally, 5 g of an aqueous solution (5% NAFION aqueous solution, manufactured by Wako Pure Chemical Industries, Ltd) containing a proton conductive material (0.25 g of NAFION (registered trademark). The resultant mixture was mixed together by using an ultrasonic disperser (UT-106H, manufactured by Sharp Manufacturing Systems Corporation) for 1 hour, to give an anode catalyst ink (1).

2. Production of Electrode Having Anode Catalyst Layer

A gas diffusion layer (carbon paper TGP-H-060, manufactured by Toray Industries Inc.,) was immersed in acetone for 30 seconds to remove grease. After drying, the gas diffusion layer was immersed in an aqueous solution of 10% polytetrafluoroethylene (hereinafter described also as "PTFE") for 30 seconds. After drying at room temperature, the resultant layer was heated at 350° C. for 1 hour to allow PTFE dispersed in the carbon paper, to give a water-repellent gas diffusion layer.

Next, a surface of the gas diffusion layer formed into a size of 5 cm×5 cm was coated with the anode catalyst ink (1) prepared in the above 1 by using an automatic spray coating machine (manufactured by San-Ei Tech Ltd) at 80° C. The spray coating was repeated to produce an electrode having an anode catalyst layer (1) having an amount of Pt of 1 mg/cm$^2$ per unit area.

Reference Example 2

Production of Anode Electrode for Single Cell Evaluation (2)

Preparation of an anode catalyst ink (11) and production of an electrode having an anode catalyst layer (11) were performed in the same operation as in Reference Example 1, except that using a platinum-ruthenium supporting carbon (TEC61E54DM, manufactured by Tanaka Kikinzoku Kogyo K.K.) was used instead of the Pt-supporting carbon (TEC61E54DM).

Example 1

1. Production of Catalyst Carrier (TiCNO)

First, for a first solution, 10.043 g of glycine is dissolved in 120 ml of distilled water.

For a second solution, while cooling in an ice bath, 10 ml of titanium tetraisopropoxide is slowly added dropwise to 5.118 ml of acetylacetone. Additionally, 16 ml of acetic acid is added thereto.

The second solution is added to the first solution in such a manner that no precipitation is produced. After that, a container containing the second solution is rinsed with 16 ml of acetic acid, and the washings are also added to the first solution.

The above clear solution was evaporated to dryness using an evaporator to give 14.2 g of a precursor.

1.0 g of the obtained precursor was thermally treated at 890° C. for 15 minutes in a 4% by volume hydrogen-containing nitrogen atmosphere to give 0.29 g of TiCNO (hereinafter described also as "carrier (1)").

FIG. 1 depicts a powder X-ray diffraction spectrum of the carrier (1) and Table 1 indicates a composition of constituent elements constituting the carrier (1) and a specific surface area of the carrier (1).

2. Production of 5 wt % Pt-Supporting TiCNO

To 100 ml of distilled water was added 950 mg of the carrier (1), and the mixture was shaken by an ultrasonic cleaning machine for 30 minutes. While stirring the obtained suspension on a hot plate to maintain the solution temperature at 80° C., 172 mg of sodium carbonate (manufactured by Wako Pure Chemical Industries, Ltd) was added to the suspension.

There was prepared, in advance, a solution of 133 mg (equivalent to 50 mg of platinum) of chloroplatinic acid 6-hydrate (manufactured by Wako Pure Chemical Industries, Ltd.,) dissolved in 50 ml of distilled water. The solution was added to the suspension over 30 minutes (the solution temperature was maintained at 80° C.). After that, the suspension was stirred at the solution temperature of 80° C. for 2 hours.

Next, to the above suspension was added 5.0 ml of 37% aqueous formaldehyde solution (Wako Pure Chemical Industries, Ltd.,) in 5 minutes, and then, the suspension was stirred for 1 hour at the solution temperature of 80° C.

After completion of the reaction, the resulting suspension was cooled down and filtered.

The resulting powder was thermally treated at 800° C. for 1 hour in a 4% by volume hydrogen-containing nitrogen atmosphere to give 903 mg of 5 wt % Pt-supporting TiCNO (hereinafter described also as "catalyst (1)"). Table 2 depicts a specific surface area of the catalyst (1).

3. Half Cell Evaluation (1) Production of Fuel Cell Electrode

In 10 g of a mixed solution of isopropyl alcohol and pure water in a mass ratio of 2:1 were placed 0.095 g of the catalyst (1) and 0.005 g of carbon (XC-72, manufactured by Cabot Corporation). The mixture was ultrasonically stirred and suspended for mixing. The resulting mixture was coated on a grassy carbon electrode (diameter: 5.2 mm, manufactured by Tokai Carbon Co., Ltd.,) and dried at 120° C. for 1 hour to form 1.0 mg of a fuel cell catalyst layer on the carbon electrode surface. Furthermore, 10 μl of a 10 fold dilution of NAFION (registered trademark) (a 5% NAFION (registered trademark) solution (DE 521) manufactured by DuPont) with pure water was coated thereon and dried at 120° C. for 1 hour to give a fuel cell electrode (1).

(2) Evaluation of Oxygen Reduction Performance

The produced fuel cell electrode (1) was polarized in a 0.5 mol/dm³ sulfuric acid solution at 30° C. under an oxygen atmosphere and a nitrogen atmosphere at a potential scanning rate of 5 mV/second to measure current-voltage characteristics. In this case, a reversible hydrogen electrode in a sulfuric acid solution having the same concentration was used as a reference electrode.

From a current-voltage characteristic curve obtained, an oxygen reduction onset potential and a current density at 0.90 V were calculated. As used herein, the potential at which the difference of 0.2 μA/cm² or more started to appear between a reduction current under the oxygen atmosphere and that under the nitrogen atmosphere was defined as an oxygen reduction onset potential. Additionally, a difference between the reduction current under the oxygen atmosphere and the reduction current under the nitrogen atmosphere at 0.9 V (vs. RHE) was calculated, and the calculated value was divided by an area of the electrode to define the resulting value as an oxygen reduction current density (mA/cm²).

Based on the oxygen reduction onset potential and the oxygen reduction current density, the catalytic performance of the produced fuel cell electrode (1) was evaluated. Table 2 indicates the measurement results. As used herein, as the oxygen reduction onset potential is higher and the oxygen reduction current density is higher, the catalytic performance of the catalyst in the fuel cell electrode, specifically the oxygen reduction catalyst performance is higher.

Figure 4:
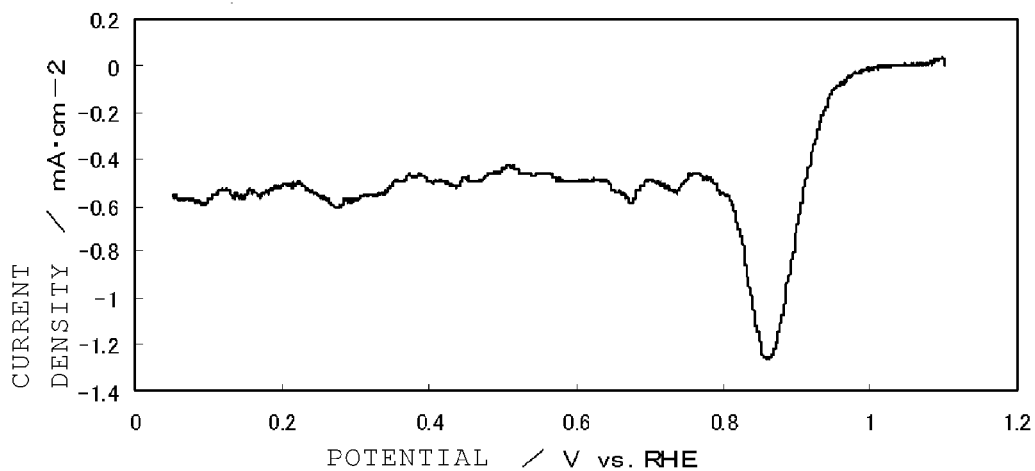
FIG. 4 is a graph illustrating the evaluation of oxygen reduction performance in a fuel cell electrode (1) of Example 1.

FIG. 4 depicts the current-voltage characteristic curve obtained by the above measurement.

The catalyst (1) produced in Example 1 had an oxygen reduction onset potential of 1.03 V (vs. RHE) and an oxygen reduction current density of 0.70 mA/cm² at 0.9 V (vs. RHE).

4. Single Cell Evaluation

To a mixed solvent of 25 ml of isopropyl alcohol (manufactured by Wako Pure Chemical Industries, Ltd.,) and 25 ml of ion-exchange water were added 0.355 g of the catalyst (1) and 0.089 g of carbon black (KETJENBLACK EC300J, manufactured by LION Corporation) as an electron conductive material, and additionally, as a proton conductive material, 5.325 g of a 5% aqueous solution of NAFION (registered trademark) (manufactured by Wako Pure Chemical Industries, Ltd.), followed by mixing for 1 hours by an ultrasonic disperser (UT-106H, manufactured by Sharp Manufacturing Systems Corporation) to give a cathode catalyst ink (1).

A gas diffusion layer (carbon paper (GDL 24BC, manufactured by SGL Carbon Group) (hereinafter described also as "GDL") was made into a size of 5 cm×5 cm, and then, a surface of the layer was coated with the cathode catalyst ink by an automatic spray coating machine (manufactured by San-Ei Tech Ltd.,) at 80° C. to give an electrode (1) having a cathode catalyst layer on the GDL surface (hereinafter referred to also as "cathode (1)"). The coating of the catalyst ink was performed in such a manner that a noble metal weight per cm² of the electrode was 0.1 mg.

There were provided NAFION (registered trademark) membrane (N-212, manufactured by DuPont) as an electrolyte membrane, the cathode (1) as a cathode electrode, and, as an anode electrode, the electrode having the anode catalyst layer (1) produced in the above Reference Example 1 (hereinafter referred to also as "anode (1)"), respectively. A fuel cell membrane electrode assembly (1) (hereinafter referred to also as "MEA (1)") including the electrolyte membrane interposed between the cathode and the anode was produced as follows.

The above electrolyte membrane was sandwiched between the cathode (1) and the anode (1), and these were thermally compressed by a hot press machine at the temperature of 140° C. under the pressure of 3 MPa for 6 minutes such that the cathode catalyst layer and the anode catalyst layer tightly adhered to the electrolyte membrane, to give an MEA.

The MEA (1) was sandwiched by two sealing materials (gaskets), two separators with a gas flow channel, two current collectors, and two rubber heaters and fixed with a bolt to tighten them up so as to reach a predetermined contact surface pressure (4N), to give a single cell (1) of a solid polymer type fuel cell (hereinafter referred to also as "single cell (1)") (cell area: 25 cm$^2$).

Temperatures of the single cell (1), an anode humidifier, and a cathode humidifier were adjusted to 90° C., 90° C., and 50° C., respectively. Hydrogen as a fuel was fed to the anode side at the flow rate of 1 L/minute and air as an oxidizing agent was fed to the cathode side at the flow rate of 2 L/minute to measure current-voltage characteristics in the single cell under ordinary pressure. From the obtained current-voltage characteristic curve, a current density at 0.75 V was calculated and the measurement results were indicated in Table 2. As the current density is higher, the catalytic power generation performance in the MEA is higher.

Example 2

1. Production of 2.5 wt % Pt-Supporting TiCNO

As a composite catalyst, 884 mg of 2.5 wt % Pt-supporting TiCNO (hereinafter referred to also as "catalyst (2)") was obtained by the same operation as in Example 1, except that 975 mg of TiCNO (the carrier (1)) obtained by the same operation as in Example 1, 86 mg of sodium carbonate, and 67 mg of chloroplatinic acid 6-hydrate (equivalent to 25 mg of platinum) were used. Table 2 indicates a specific surface area of the catalyst (2).

2. Half Cell Evaluation

A fuel cell electrode (2) was obtained by the same operation as in Example 1 except that the catalyst (2) was used instead of the catalyst (1), and current-voltage characteristics were measured by performing the same operation as in Example 1 except that the fuel cell electrode (2) was used instead of the fuel cell electrode (1).

From the obtained current-voltage characteristic curve, an oxygen reduction onset potential and a current density at 0.90 V were calculated. Table 2 indicates the measurement results.

Figure 5:
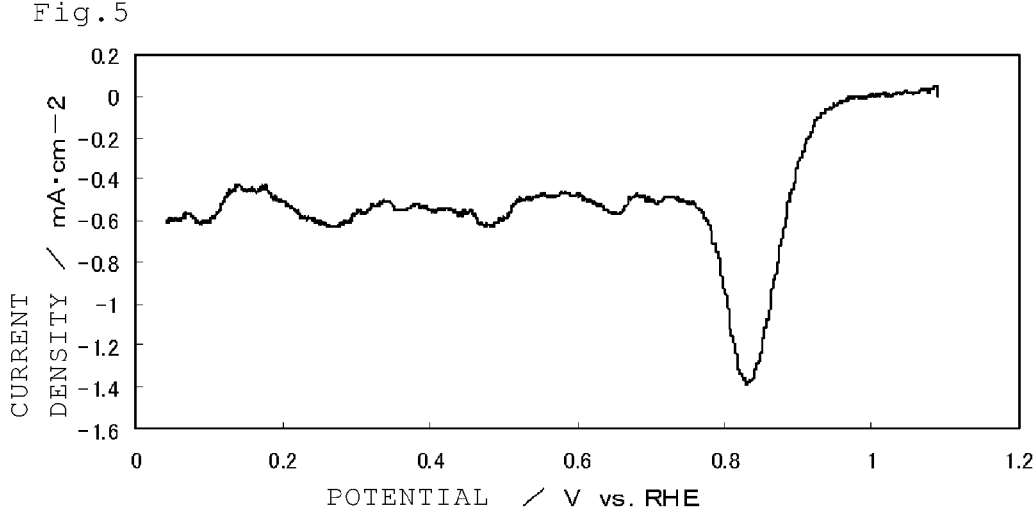
FIG. 5 is a graph illustrating the evaluation of oxygen reduction performance in a fuel cell electrode (2) of Example 2.

FIG. 5 depicts a current-potential curve obtained by the above measurement.

The catalyst (2) produced in Example 2 had an oxygen reduction onset potential of 1.01 V (vs. RHE) and an oxygen reduction current density of 0.34 mA/cm$^2$ at 0.9 V (vs. RHE).

3. Single Cell Evaluation

The preparation of a cathode catalyst ink (2), the production of a cathode (2), the production of a MEA (2), and the production of a single cell (2) were performed by the same operation as in Example 1 except that the catalyst (2) was used instead of the catalyst (1), and current-voltage characteristics were measured. From the current-voltage characteristic curve obtained, a current density at 0.75 V was calculated. The measurement result was listed in Table 2.

Example 3

1. Production of Catalyst Carrier (TiFeCNO)

14.8 g of a precursor was obtained from synthesis by the same operation as in Example 1 except that 0.5818 g of iron(II) acetate was added to the first solution.

1.0 g of the obtained precursor was thermally treated at 890° C. for 15 minutes in a 4% by volume hydrogen-containing nitrogen atmosphere to give 0.28 g of TiFeCNO (hereinafter referred to also as "carrier (2)").

Figure 2:
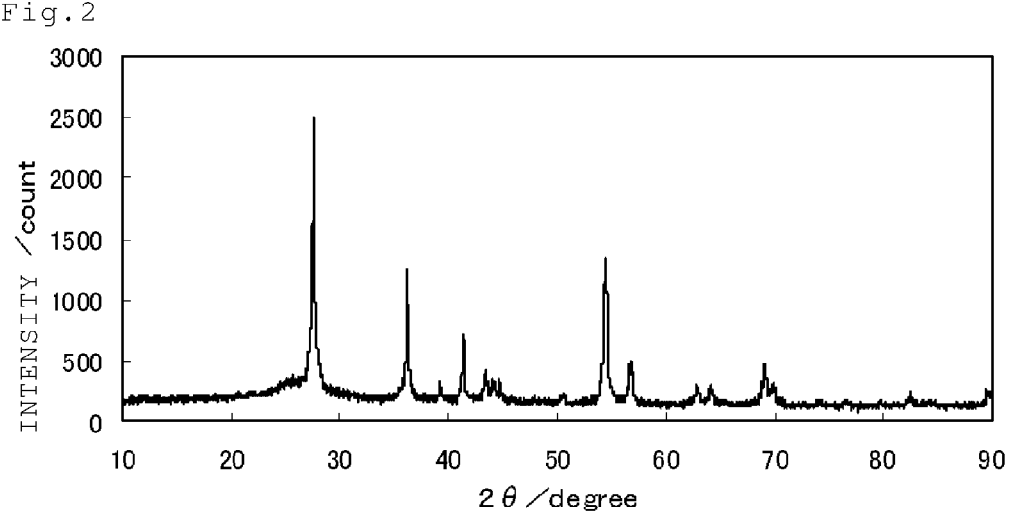
FIG. 2 denotes a powder X-ray diffraction spectrum of a carrier (2) obtained in Example 3.

FIG. 2 indicates a powder X-ray diffraction spectrum of the carrier (2) and Table 1 indicates a composition of constituent elements constituting the carrier (2) and a specific surface area of the carrier (2).

2. Production of 20 wt % Pt-Supporting TiFeCNO 909 mg of 20 wt % Pt-supporting TiFeCNO (hereinafter referred to also as "catalyst (3)") was obtained by the same operation as in Example 1 except that 800 mg of TiFeCNO (the carrier (2)), 688 mg of sodium carbonate, and 536 mg of chloroplatinic acid 6-hydrate (equivalent to 200 mg of platinum) were used. Table 2 indicates a specific surface area of the catalyst (3).

3. Half Cell Evaluation

A fuel cell electrode (3) was obtained by the same operation as in Example 1 except that the catalyst (3) was used instead of the catalyst (1), and current-voltage characteristics were measured by the same operation as in Example 1 except that the fuel cell electrode (3) was used instead of the fuel cell electrode (1).

From the current-voltage characteristic curve obtained, an oxygen reduction onset potential and a current density at 0.90 V were calculated. Table 2 indicates the measurement results.

Figure 6:
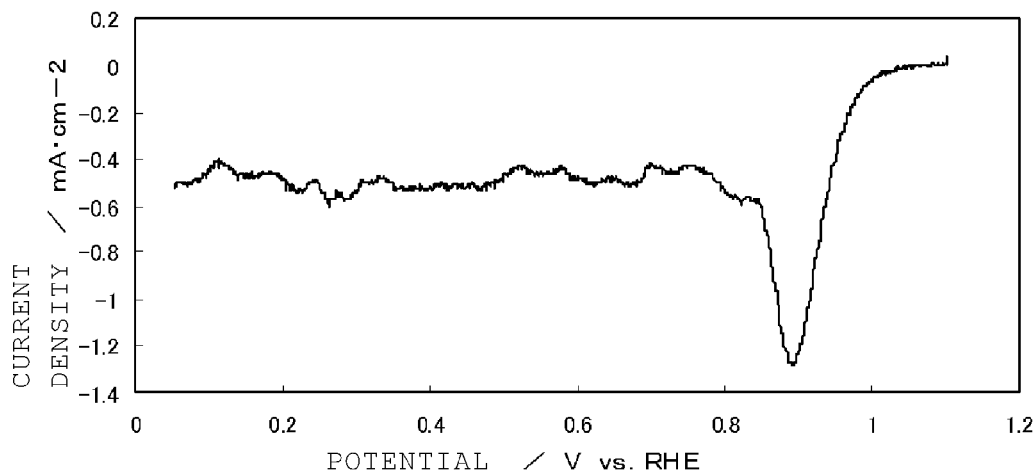
FIG. 6 is a graph illustrating the evaluation of oxygen reduction performance in a fuel cell electrode (3) of Example 3.

FIG. 6 depicts a current-potential curve obtained by the above measurement.

The catalyst (3) produced in Example 3 had an oxygen reduction onset potential of 1.06 V (vs. RHE) and an oxygen reduction current density of 1.55 mA/cm$^2$ at 0.9 V (vs. RHE).

4. Single Cell Evaluation

The preparation of a cathode catalyst ink (3), the production of a cathode (3), the production of a MEA (3), and the production of a single cell (3) were performed by the same operation as in example 1 except the catalyst (3) was used instead of the catalyst (1), and current-voltage characteristics were measured. From the current-voltage characteristic curve obtained, a current density at 0.75 V was calculated. The measurement result was listed in Table 2.

Example 4

1. Production of 15 wt % Pt-Supporting TiFeCNO 878 mg of 15 wt % Pt-supporting TiFeCNO (hereinafter described also as "catalyst (4)") was obtained by the same operation as in Example 1 except that 850 mg of TiFeCNO (the carrier (2)) obtained by the same operation as in Example 3, 516 mg of sodium carbonate, and 402 mg of chloroplatinic acid 6-hydrate (equivalent to 150 mg of platinum) were used. Table 2 indicates a specific surface area of the catalyst (4).

2. Half Cell Evaluation

A fuel cell electrode (4) was obtained by the same operation as in Example 1 except the catalyst (4) was used instead of the catalyst (1), and current-voltage characteristics were measured by the same operation as in Example 1 except that the fuel cell electrode (4) was used instead of the fuel cell electrode (1).

From the current-voltage characteristic curve obtained, an oxygen reduction onset potential and a current density at 0.90 V were calculated. Table 2 indicates the measurement results.

Figure 7:
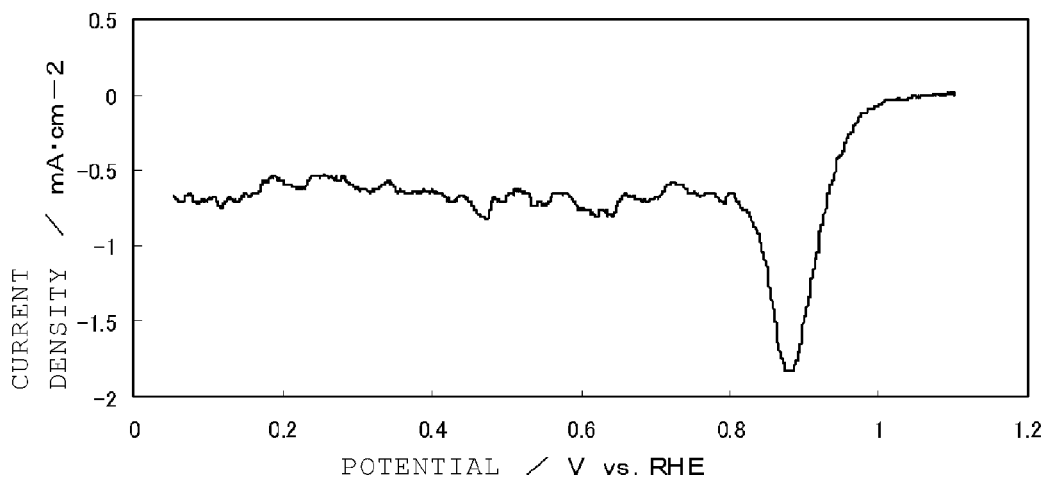
FIG. 7 is a graph illustrating the evaluation of oxygen reduction performance in a fuel cell electrode (4) of Example 4.

FIG. 7 depicts a current-potential curve obtained by the above measurement.

The catalyst (4) produced in Example 4 had an oxygen reduction onset potential of 1.06 V (vs. RHE) and an oxygen reduction current density of 1.49 mA/cm$^2$ at 0.9 V (vs. RHE).

3. Single Cell Evaluation

The preparation of a cathode catalyst ink (4), the production of a cathode (4), the production of a MEA (4), and the production of a single cell (4) were performed by the same operation as in example 1 except that the catalyst (4) was used instead of the catalyst (1), and current-voltage characteristics were measured. From the current-voltage characteristic curve obtained, a current density at 0.75 V was calculated, and the measurement result was listed in Table 2.

Example 5

1. Production of 10 wt % Pt-Supporting TiFeCNO 882 mg of 15 wt % Pt-supporting TiFeCNO (hereinafter described also as "catalyst (5)") was obtained by the same operation as in Example 1 except 900 mg of TiFeCNO (the carrier (2)) obtained by the same operation as in Example 3, 344 mg of sodium carbonate, and 268 mg of chloroplatinic acid 6-hydrate (equivalent to 100 mg of platinum) were used. Table 2 indicates a specific surface area of the catalyst (5).

2. Half Cell Evaluation

A fuel cell electrode (5) was obtained by the same operation as in Example 1 except that the catalyst (5) was used instead of the catalyst (1), and current-voltage characteristics were measured by the same operation as in Example 1 except that the fuel cell electrode (5) was used instead of the fuel cell electrode (1).

From a curve of the current-voltage characteristics obtained, an oxygen reduction onset potential and a current density at 0.90 V were calculated. Table 2 indicates the measurement results.

Figure 8:
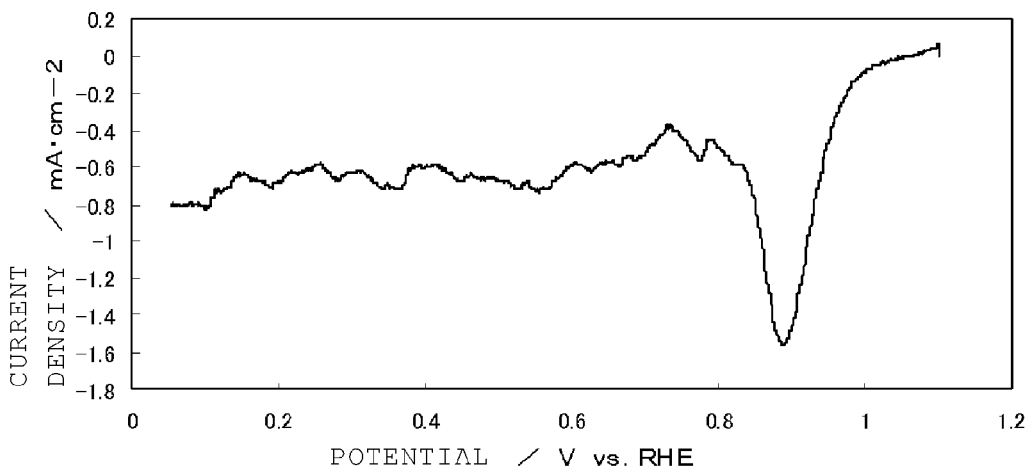
FIG. 8 is a graph illustrating the evaluation of oxygen reduction performance in a fuel cell electrode (5) of Example 5.

FIG. 8 depicts a current-potential curve obtained by the above measurement.

The catalyst (5) produced in Example 5 had an oxygen reduction onset potential of 1.06 V (vs. RHE) and an oxygen reduction current density of 1.47 mA/cm$^2$ at 0.9 V (vs. RHE).

3. Single Cell Evaluation

The preparation of a cathode catalyst ink (5), the production of a cathode (5), the production of a MEA (5), and the production of a single cell (5) were performed by the same operation as in example 1 except that the catalyst (5) was used instead of the catalyst (1), and current-voltage characteristics were measured. From a curve of the current-voltage characteristics obtained, a current density at 0.75 V was calculated and the measurement result was listed in Table 2.

Example 6

1. Production of 5 wt % Pt-Supporting TiFeCNO 870 mg of 5 wt % Pt-supporting TiFeCNO (hereinafter described also as "catalyst (6)") was obtained by the same operation as in Example 1 except that the carrier (2) was used instead of the carrier (1). Table 2 indicates a specific surface area of the catalyst (6).

2. Half Cell Evaluation

A fuel cell electrode (6) was obtained by the same operation as in Example 1 except that the catalyst (6) was used instead of the catalyst (1), and current-voltage characteristics were measured by the same operation as in Example 1 except that the fuel cell electrode (6) was used instead of the fuel cell electrode (1).

From a current-voltage characteristic curve obtained, an oxygen reduction onset potential and a current density at 0.90 V were calculated. Table 2 indicates the measurement results.

Figure 9:
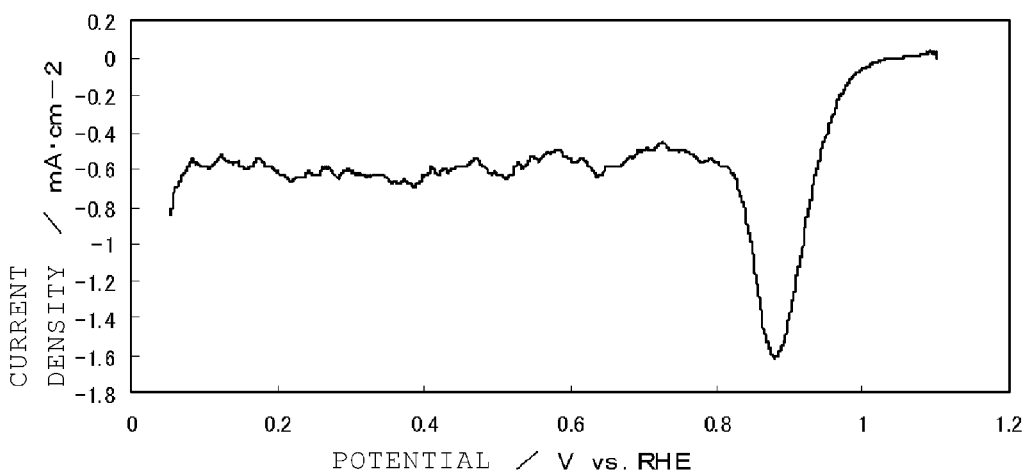
FIG. 9 is a graph illustrating the evaluation of oxygen reduction performance in a fuel cell electrode (6) of Example 6.

FIG. 9 depicts a current-potential curve obtained by the above measurement.

The catalyst (6) produced in Example 6 had an oxygen reduction onset potential of 1.05 V (vs. RHE) and an oxygen reduction current density of 1.38 mA/cm$^2$ at 0.9 V (vs. RHE).

3. Single Cell Evaluation

The preparation of a cathode catalyst ink (6), the production of a cathode (6), the production of a MEA (6), and the production of a single cell (6) were performed by the same operation as in example 1 except that the catalyst (6) was used instead of the catalyst (1), and current-voltage characteristics were measured. From a curve of the current-voltage characteristics obtained, a current density at 0.75 V was calculated and the measurement result was listed in Table 2.

Example 7

1. Production of 2.5 wt % Pt-Supporting TiFeCNO 895 mg of 2.5 wt % Pt-supporting TiFeCNO (hereinafter described also as "catalyst (7)") was obtained by the same operation as in Example 1 except that 975 mg of TiFeCNO (the carrier (2)) obtained by the same operation as in Example 3, 86 mg of sodium carbonate, and 67 mg of chloroplatinic acid 6-hydrate (equivalent to 25 mg of platinum) were used. Table 2 indicates a specific surface area of the catalyst (7).

2. Half Cell Evaluation

A fuel cell electrode (7) was obtained by the same operation as in Example 1 except that the catalyst (7) was used instead of the catalyst (1), and current-voltage characteristics were measured by the same operation as in Example 1 except that the fuel cell electrode (7) was used instead of the fuel cell electrode (1).

From a curve of the current-voltage characteristics obtained, an oxygen reduction onset potential and a current density at 0.90 V were calculated. Table 2 indicates the measurement results.

Figure 10:
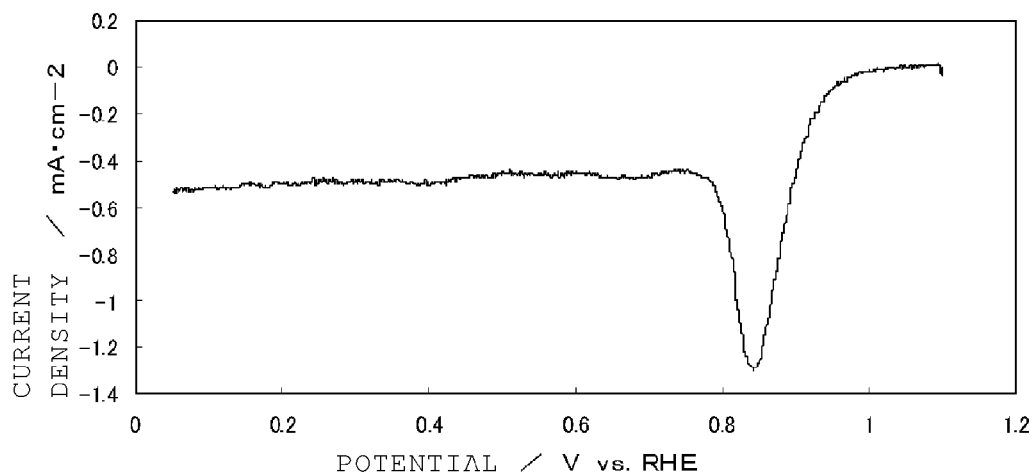
FIG. 10 is a graph illustrating the evaluation of oxygen reduction performance in a fuel cell electrode (7) of Example 7.

FIG. 10 depicts a current-potential curve obtained by the above measurement.

The catalyst (7) produced in Example 7 had an oxygen reduction onset potential of 1.01 V (vs. RHE) and an oxygen reduction current density of 0.45 mA/cm$^2$ at 0.9 V (vs. RHE).

3. Single Cell Evaluation

The preparation of a cathode catalyst ink (7), the production of a cathode (7), the production of a MEA (7), and the production of a single cell (7) were performed by the same operation as in example 1 except that the catalyst (7) was used instead of the catalyst (1), and current-voltage characteristics were measured. From a curve of the current-voltage characteristics obtained, a current density at 0.75 V was calculated. The measurement result was listed in Table 2.

Example 8

1. Production of Catalyst Carrier (NbFeCNO)

16.3 g of a precursor was obtained from synthesis by the same operation as in Example 3 except that 8.494 ml of niobium(V) ethoxide (manufactured by Wako Pure Chemical Industries, Ltd.,) was added instead of titanium tetraisopropoxide, to the first solution.

1.0 g of the obtained precursor was thermally treated at 890° C. for 15 minutes in a 4% by volume hydrogen-containing nitrogen atmosphere to give 0.37 g of NbFeCNO (hereinafter described also as "carrier (3)").

Table 1 indicates a composition of constituent elements constituting the carrier (3) and a specific surface area of the carrier (3).

2. Production of 2.5 wt % Pt-Supporting NbFeCNO 895 mg of 2.5 wt % Pt-supporting NbFeCNO (hereinafter described also as "catalyst (8)") was obtained by the same operation as in Example 2 except that the carrier (3) was used instead of the carrier (1). Table 2 indicates a specific surface area of the catalyst (8).

3. Half Cell Evaluation

A fuel cell electrode (8) was obtained by the same operation as in Example 1 except that the catalyst (8) was used instead of the catalyst (1), and current-voltage characteristics were measured by performing the same operation as in Example 1 except that the fuel cell electrode (8) was used instead of the fuel cell electrode (1).

From a curve of the obtained current-voltage characteristics, an oxygen reduction onset potential and a current density at 0.90 V were calculated. Table 2 indicates the measurement results.

Figure 11:
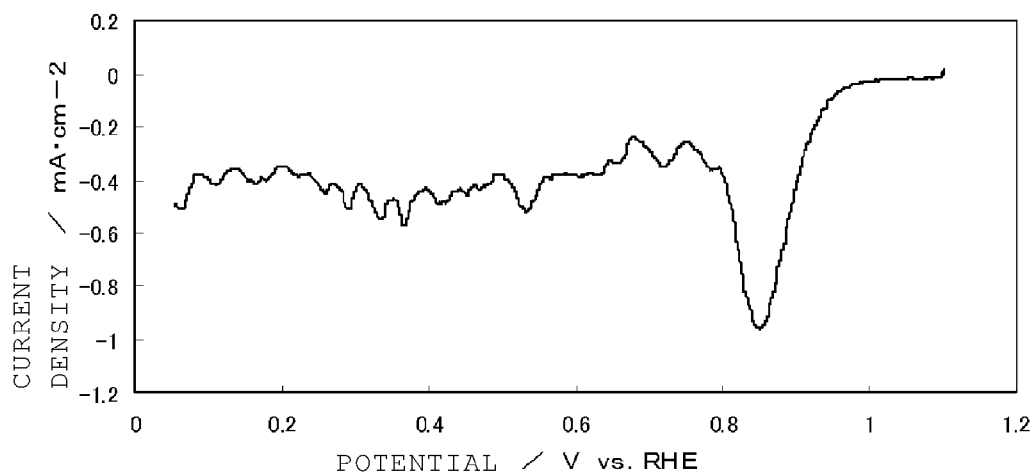
FIG. 11 is a graph illustrating the evaluation of oxygen reduction performance in a fuel cell electrode (8) of Example 8.

FIG. 11 depicts a current-potential curve obtained by the above measurement.

The catalyst (8) produced in Example 8 had an oxygen reduction onset potential of 1.03 V (vs. RHE) and an oxygen reduction current density of 0.42 mA/cm$^2$ at 0.9 V (vs. RHE).

4. Single Cell Evaluation

The preparation of a cathode catalyst ink (8), the production of a cathode (8), the production of a MEA (8), and the production of a single cell (8) were performed by the same operation as in example 1 except that the catalyst (8) was used instead of the catalyst (1), and current-voltage characteristics were measured. From a curve of the current-voltage characteristics obtained, a current density at 0.75 V was calculated. The measurement result was listed in Table 2.

Example 9

1. Production of Catalyst Carrier (ZrFeCNO)

15.7 g of a precursor was obtained from synthesis by the same operation as in Example 3 except that 8.280 ml of 85% zirconium(IV) butoxide 1-butanol solution (manufactured by Wako Pure Chemical Industries, Ltd.,) was added instead of titanium tetraisopropoxide to the first solution.

1.0 g of the obtained precursor was thermally treated at 890° C. for 15 minutes in a 4% by volume hydrogen-containing nitrogen atmosphere to give 0.35 g of ZrFeCNO (hereinafter described also as "carrier (4)").

Table 1 indicates a composition of constituent elements constituting the carrier (4) and a specific surface area of the carrier (4).

2. Production of 2.5 wt % Pt-Supporting ZrFeCNO 886 g of 2.5 wt % Pt-supporting ZrFeCNO (hereinafter described also as "catalyst (9)") was obtained by the same operation as in Example 2 except that the carrier (4) was used instead of the carrier (1). Table 2 indicates a specific surface area of the catalyst (9).

3. Half Cell Evaluation

A fuel cell electrode (9) was obtained by the same operation as in Example 1 except that the catalyst (9) was used instead of the catalyst (1), and current-voltage characteristics were measured by performing the same operation as in Example 1 except that the fuel cell electrode (9) was used instead of the fuel cell electrode (1).

From a curve of the current-voltage characteristics obtained, an oxygen reduction onset potential and a current density at 0.90 V were calculated. Table 2 indicates the measurement results.

Figure 12:
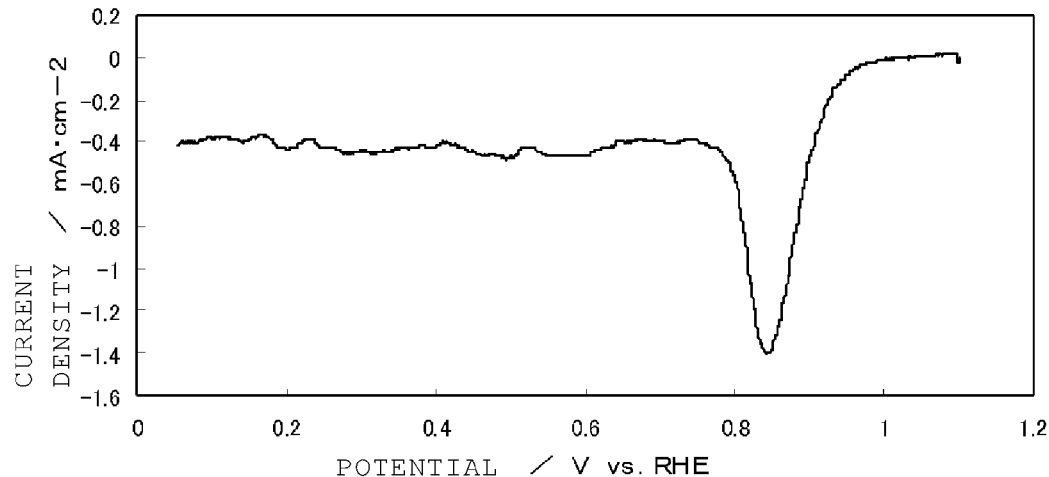
FIG. 12 is a graph illustrating the evaluation of oxygen reduction performance in a fuel cell electrode (9) of Example 9.

FIG. 12 depicts a current-potential curve obtained by the above measurement.

The catalyst (9) produced in Example 9 had an oxygen reduction onset potential of 1.02 V (vs. RHE) and an oxygen reduction current density of 0.48 mA/cm$^2$ at 0.9 V (vs. RHE).

4. Single Cell Evaluation

The preparation of a cathode catalyst ink (9), the production of a cathode (9), the production of a MEA (9), and the production of a single cell (9) were performed by the same operation as in example 1 except that the catalyst (9) was used instead of the catalyst (1), and current-voltage characteristics were measured. From a curve of the current-voltage characteristics obtained, a current density at 0.75 V was calculated. The measurement result was listed in Table 2.

Example 10

1. Production of Catalyst Carrier (TaFeCNO)

18.7 g of a precursor was obtained from synthesis by the same operation as in Example 3 except that 6.653 ml of tantalum(V) ethoxide (manufactured by Wako Pure Chemical Industries, Ltd.) was added instead of titanium tetraisopropoxide to the first solution.

1.0 g of the obtained precursor was thermally treated at 890° C. for 15 minutes in a 4% by volume hydrogen-containing nitrogen atmosphere to give 0.44 g of TaFeCNO (hereinafter described also as "carrier (5)").

Table 1 indicates a composition of constituent elements constituting the carrier (5) and a specific surface area of the carrier (5).

2. Production of 2.5 wt % Pt-Supporting TaFeCNO 898 mg of 2.5 wt % Pt-supporting TaFeCNO (hereinafter described also as "catalyst (10)") was obtained by the same operation as in Example 2 except that the carrier (5) was used instead of the carrier (1). Table 2 indicates a specific surface area of the catalyst (10).

3. Half Cell Evaluation

A fuel cell electrode (10) was obtained by the same operation as in Example 1 except that the catalyst (10) was used instead of the catalyst (1), and current-voltage characteristics were measured by performing the same operation as in Example 1 except that the fuel cell electrode (10) was used instead of the fuel cell electrode (1).

From a curve of the current-voltage characteristics obtained, an oxygen reduction onset potential and a current density at 0.90 V were calculated. Table 2 indicates the measurement results.

Figure 13:
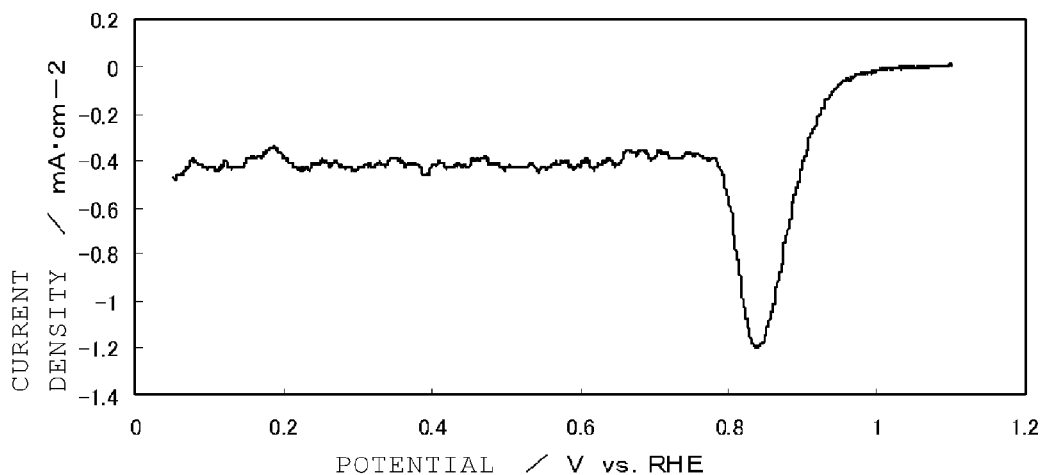
FIG. 13 is a graph illustrating the evaluation of oxygen reduction performance in a fuel cell electrode (10) of Example 10.

FIG. 13 depicts a current-potential curve obtained by the above measurement.

The catalyst (10) produced in Example 10 had an oxygen reduction onset potential of 1.00 V (vs. RHE) and an oxygen reduction current density of 0.43 mA/cm$^2$ at 0.9 V (vs. RHE).

4. Single Cell Evaluation

The preparation of a cathode catalyst ink (10), the production of a cathode (10), the production of a MEA (10), and the production of a single cell (10) were performed by the same operation as in example 1 except that the catalyst (10) was used instead of the catalyst (1), and current-voltage characteristics were measured. From a curve of the current-voltage characteristics obtained, a current density at 0.75 V was calculated. The measurement result was listed in Table 2.

Example 11

1. Production of 5 wt % Pd-Supporting TiFeCNO

To 150 ml of distilled water was added 612 mg of TiFeCNO (the carrier (2)), and the mixture was shaken for 30 minutes by an ultrasonic cleaning machine. The resulting suspension was stirred on a hot plate to maintain the solution temperature at 80° C.

In addition to the suspension, there was prepared in advance a solution of 529.2 mg of tetraamminepalladium(II) chloride (manufactured by Wako Pure Chemical Industries, Ltd.,) (equivalent to 32.3 mg of palladium) dissolved in 52 ml of distilled water.

Then, the above solution was added to the suspension over 30 minutes (the solution temperature was maintained at 80° C.) Subsequently, the suspension was stirred at the solution temperature of 80° C. for 2 hours.

Next, 1 M sodium hydroxide was slowly added until pH of the suspension became 11. Then, to the suspension was slowly added 1 M sodium borohydride in an amount allowing the above metal component (namely, tetraamminepalladium(II) chloride) to be sufficiently reduced (in which the ratio of sodium borohydride to the above metal component was 10:1 or more in a metal mole ratio). After that, the suspension is stirred at the solution temperature of 80° C. for 1 hour. After completion of the reaction, the suspension is cooled down and filtered.

The resulting powder was thermally treated at 300° C. for 1 hour in a 4% by volume hydrogen-containing nitrogen atmosphere to give 644 mg of 5 wt % Pd-supporting TiFeCNO (hereinafter described also as "catalyst (11)") as a composite catalyst. Table 3 indicates a specific surface area of the catalyst (11).

2. Single Cell Evaluation

To a mixed solvent of 25 ml of isopropyl alcohol (manufactured by Wako Pure Chemical Industries, Ltd.,) and 25 ml of ion-exchange water were added 0.355 g of the catalyst (11) and 0.089 g of carbon black (KETJENBLACK EC300J manufactured by LION Corporation) as an electron conductive material, and additionally, as a proton conductive material, 5.325 g of a 5% aqueous solution of NAFION (registered trademark) (manufactured by Wako Pure Chemical Industries, Ltd.), followed by mixing for 1 hour by an ultrasonic disperser (UT-106H, manufactured by Sharp Manufacturing Systems Corporation) to give a cathode catalyst ink (11).

A surface of a gas diffusion layer (carbon paper (GDL 24BC, manufactured by SGL Carbon Group) (hereinafter described also as "GDL") made into a size of 5 cm×5 cm was coated with the above cathode catalyst ink by an automatic spray coating machine (manufactured by San-Ei Tech Ltd.,) at 80° C. to give an electrode (11) having a cathode catalyst layer on the GDL surface (hereinafter referred to also as "cathode (11)"). The coating of the catalyst ink was performed in such a manner that a noble metal weight per cm$^2$ of the electrode was 0.1 mg.

There were provided NAFION (registered trademark) membrane (N-212, manufactured by DuPont) as an electrolyte membrane, the cathode (11) as a cathode electrode, and, as an anode electrode, the electrode having the anode catalyst layer (11) produced in the above Reference Example 2 (hereinafter referred to also as "anode (11)"), respectively. A fuel cell membrane electrode assembly (11) (hereinafter referred to also as "MEA (11)") including the electrolyte membrane interposed between the cathode and the anode was produced as follows.

The electrolyte membrane was sandwiched between the cathode (11) and the anode (11) such that the cathode catalyst layer and the anode catalyst layer tightly adhered to the electrolyte membrane to give a single cell (11) hereinafter referred to also as "single cell (11)") (cell area: 5 cm$^2$).

The above single cell (11) was maintained at 60° C., and 5 mol/dm$^3$ of methanol was fed to the anode at a rate of 1 ml/minute. Oxygen as an oxidizing agent was fed to the cathode side at a flow rate of 400 ml/minute, and current-voltage characteristics in the single cell were measured under ordinary pressure. From a curve of the current-voltage characteristics obtained, a current density at 0.30 V was calculated. The measurement result was listed in Table 3.

Example 12

1. Production of 5 wt % Pd—Pt-Supporting TiFeCNO

To 150 ml of distilled water was added 612 mg of TiFeCNO (the carrier (2)), and the mixture was shaken for 30 minutes by an ultrasonic cleaning machine. The suspension was stirred on a hot plate to maintain the solution temperature at 80° C.

In addition to the suspension, there was prepared in advance a solution of 353.3 mg of tetraamminepalladium(II) chloride (manufactured by Wako Pure Chemical Industries, Ltd.) (equivalent to 21.5 mg of palladium) and 28.4 mg of chloroplatinic acid 6-hydrate (manufactured by Wako Pure Chemical Industries, Ltd.,) (equivalent to 10.7 mg of platinum) dissolved in 52 ml of distilled water.

Then, the solution was added to the suspension over 30 minutes (the solution temperature was maintained at 80° C.). After that, the suspension was stirred at the solution temperature of 80° C. for 2 hours.

Next, 1 M sodium hydroxide was slowly added until pH of the suspension became 11, and then, to the suspension was slowly added 1 M sodium borohydride in an amount allowing the above metal components (namely, tetraamminepalladium (II) chloride and chloroplatinic acid 6-hydrate) to be sufficiently reduced (in which the ratio of sodium borohydride to the above metal components was 10:1 or more in a metal mole ratio). After that, the suspension is stirred at the solution temperature of 80° C. for 1 hour. After completion of the reaction, the suspension is cooled down and filtered.

The resulting powder was thermally treated at 300° C. for 1 hour in a 4% by volume hydrogen-containing nitrogen atmosphere to give 644 mg of 5 wt % Pd—Pt alloy-supporting TiFeCNO (hereinafter described also as "catalyst (12)") as a composite catalyst. Table 3 indicates a specific surface area of the catalyst (12).

2. Single Cell Evaluation

The preparation of a cathode catalyst ink (12), the production of a cathode (12), the production of a MEA (12), and the production of a single cell (12) were performed by the same operation as in Example 11 except that the catalyst (12) was used instead of the catalyst (1), and current-voltage characteristics were measured.

From a curve of the current-voltage characteristics obtained, an oxygen reduction onset potential and a current density at 0.30 V were calculated. The measurement results were listed in Table 3.

Example 13

1. Production of 5 wt % Pt-Supporting TiFeCNO

To 150 ml of distilled water was added 612 mg of TiFeCNO (the carrier (2)), and the mixture was shaken for 30 minutes by an ultrasonic cleaning machine. The suspension was stirred on a hot plate to maintain the solution temperature at 80° C.

In addition to the suspension, there was prepared in advance a solution of 85.5 mg of chloroplatinic acid 6-hydrate (manufactured by Wako Pure Chemical Industries, Ltd.,) (equivalent to 32.2 mg of platinum) dissolved in 52 ml of distilled water.

Then, the solution was added to the suspension over 30 minutes (the resulting solution temperature was maintained at 80° C.). After that, the suspension was stirred at the solution temperature of 80° C. for 2 hours.

Next, 1 M sodium hydroxide was slowly added until pH of the suspension became 11, and then, to the suspension was slowly added 1 M sodium borohydride in an amount allowing the above metal component (namely, chloroplatinic acid 6-hydrate) to be sufficiently reduced (in which the ratio of sodium borohydride to the above metal component was 10:1 or more in a metal mole ratio). After that, the suspension is stirred at the solution temperature of 80° C. for 1 hour. After completion of the reaction, the suspension is cooled down and filtered.

The resulting powder was thermally treated at 300° C. for 1 hour in a 4% by volume hydrogen-containing nitrogen atmosphere to give 644 mg of 5 wt % Pt-supporting TiFeCNO (hereinafter described also as "catalyst (13)") as a composite catalyst. Table 3 indicates a specific surface area of the catalyst (13).

2. Single Cell Evaluation

The preparation of a cathode catalyst ink (13), the production of a cathode (13), the production of a MEA (13), and the production of a single cell (13) were performed by the same operation as in Example 11 except that the catalyst (13) was used instead of the catalyst (1), and current-voltage characteristics were measured.

From a curve of the current-voltage characteristics obtained, an oxygen reduction onset potential and a current density at 0.30 V were calculated. The measurement results were listed in Table 3.

Comparative Example 1

1. Half Cell Evaluation (1) Production of Fuel Cell Electrode

To 10 g of a mixed solution of isopropyl alcohol and pure water in a mass ratio of 2:1 were added 0.095 g of 67.4% Pt/C (TEC10E70TPM, manufactured by Tanaka Kikinzoku Kogyo K.K.) (hereinafter described also as "catalyst (14)") and 0.005 g of carbon (XC-72, manufactured by Cabot Corporation). The mixture was ultrasonically stirred and suspended for mixing. The resulting mixture was coated on a grassy carbon electrode (diameter: 5.2 mm, manufactured by Tokai Carbon Co., Ltd.,) and dried at 120° C. for 1 hour to form 0.070 mg of a catalyst layer on the carbon electrode surface such that an amount of Pt in terms of elemental Pt is equivalent to that in the fuel cell electrode (1) produced using 5 wt % Pt/TiFeCNO of Example 1 and that in the fuel cell electrode (6) produced using 5 wt % Pt/TiFeCNO of Example 6. Furthermore, 0.71 µl of a 10 fold dilution of NAFION (registered trademark) (a 5% NAFION (registered trademark) solution (DE 521) manufactured by DuPont) with isopropyl alcohol was coated thereon and dried at 120° C. for 1 hour to give a fuel cell electrode (11).

(2) Evaluation of Oxygen Reduction Performance

Current-voltage characteristics were measured by performing the same operation as in Example 1.

From a curve of the current-voltage characteristics obtained, an oxygen reduction onset potential and a current density at 0.90 V were calculated. Table 2 indicates the measurement results.

Figure 14:
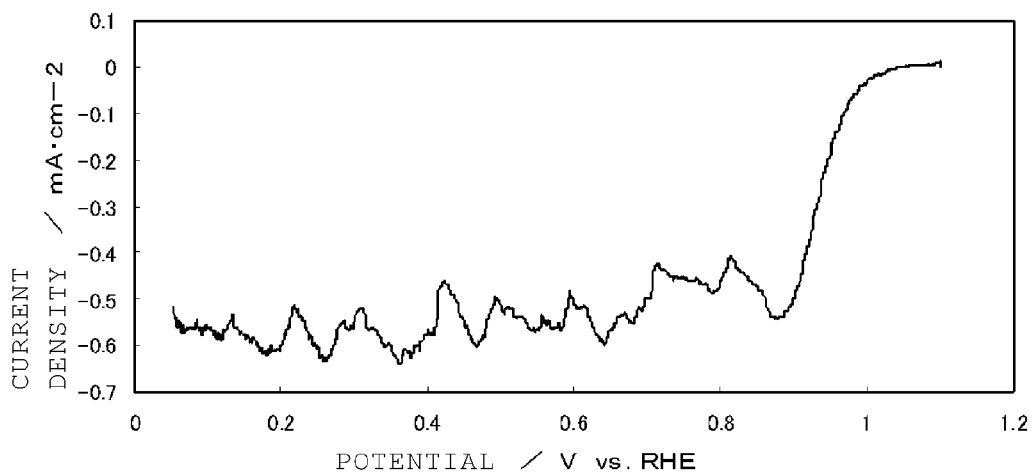
FIG. 14 is a graph illustrating the evaluation of oxygen reduction performance in a fuel cell electrode (11) of Comparative Example 1.

FIG. 14 depicts a current-potential curve obtained by the above measurement.

The catalyst (14) of Comparative Example 1 had an oxygen reduction onset potential of 1.05 V (vs. RHE) and an oxygen reduction current density of 0.50 mA/cm$^2$ at 0.9 V (vs. RHE).

3. Single Cell Evaluation

The preparation of a cathode catalyst ink (14), the production of a cathode (14), the production of a MEA (14), and the production of a single cell (14) were performed by the same operation as in Example 1 except that the catalyst (14) was used instead of the catalyst (1), and current-voltage characteristics were measured. From a curve of the current-voltage characteristics obtained, a current density at 0.75 V was calculated, and the measurement result was listed in Table 2.

Comparative Example 2

1. Half Cell Evaluation (1) Production of Fuel Cell Electrode

A fuel cell electrode (12) was obtained by the same operation as in Comparative Example 1 except that 0.035 mg of a catalyst layer was formed on the carbon electrode surface such that an amount of Pt obtained when 67.4% Pt/C (TEC10E70TPM, manufactured by Tanaka Kikinzoku Kogyo K.K.) (the catalyst (14)) is expressed in terms of elemental Pt is equivalent to those in the fuel cell electrodes (2) and (7) to (10) produced using 2.5 wt % Pt/TiCNO of Example 2 and 2.5 wt % Pt/TiFeCNO, 2.5 wt % Pt/Nb-FeCNO, 2.5 wt % Pt/ZrFeCNO, and 2.5 wt % Pt/TaFeCNO of Examples 7 to 10.

(2) Evaluation of Oxygen Reduction Performance

Current-Voltage Characteristics were measured by performing the same operation as in Example 1.

From a curve of the current-voltage characteristics obtained, an oxygen reduction onset potential and a current density at 0.90 V were calculated. Table 2 indicates the measurement results.

Figure 15:
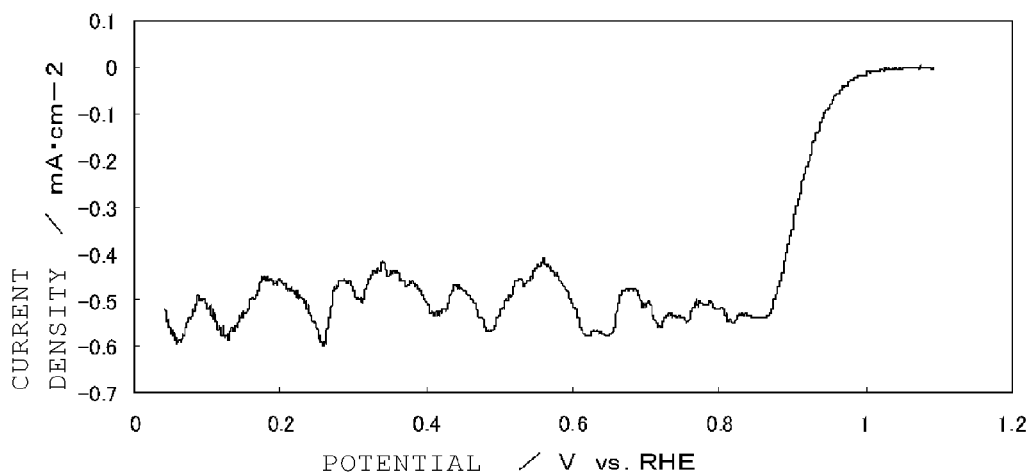
FIG. 15 is a graph illustrating the evaluation of oxygen reduction performance in a fuel cell electrode (12) of Comparative Example 2.

FIG. 15 depicts a current-potential curve obtained by the above measurement.

The catalyst (14) of Comparative Example 2 had an oxygen reduction onset potential of 1.02 V (vs. RHE) and an oxygen reduction current density of 0.34 mA/cm$^2$ at 0.9 V (vs. RHE).

Comparative Example 3

1. Production of Catalyst Carrier (TiCNO)

As described below, a thermally treated product as a carrier was obtained by a method (hereinafter described as "solid phase") different from the production process of the present invention.

5.73 g of titanium carbonitride was obtained by sufficiently mixing 5.10 g of titanium carbide, 0.80 g of titanium oxide, and 0.31 g of titanium nitride and thermally treating the mixture at 1800° C. for 3 hours in a nitrogen atmosphere.

1.00 g of the obtained titanium carbonitride was thermally treated at 1000° C. for 10 hours in a 1% by volume of oxygen and 4% by volume of hydrogen-containing nitrogen atmosphere to give 1.31 g of TiCNO (hereinafter described also as "carrier (6)").

Figure 3:
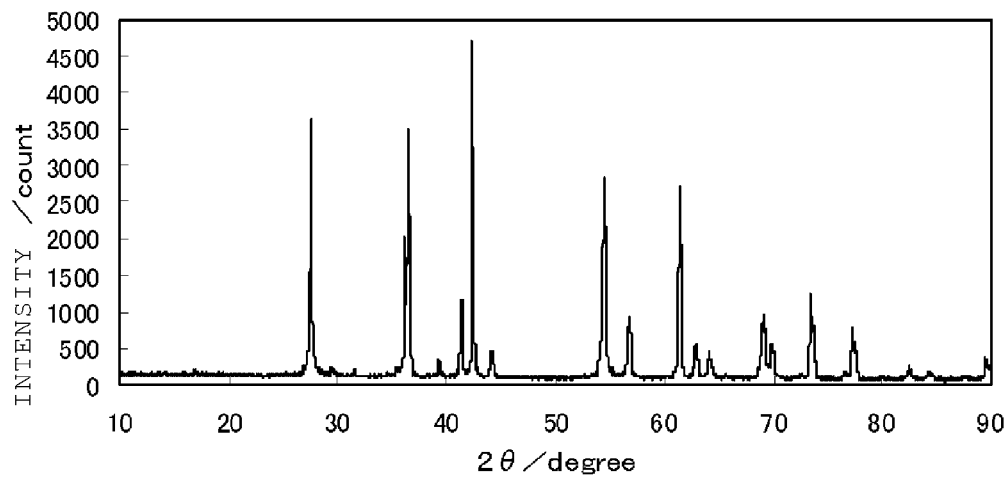
FIG. 3 denotes a powder X-ray diffraction spectrum of a carrier (3) obtained in Comparative Example 3.

FIG. 3 depicts a powder X-ray diffraction spectrum of the carrier (6).

2. Production of 5 wt % Pt-Supporting TiCNO 845 mg of 5 wt % Pt-supporting TiCNO (hereinafter described also as "catalyst (15)") as a composite catalyst was obtained by the same operation as in Example 1 except that the carrier (6) was used instead of the carrier (1). Table 3 indicates a specific surface area of the catalyst (15).

3. Half Cell Evaluation

A fuel cell electrode (13) was obtained by the same operation as in Example 1 except that the catalyst (15) was used instead of the catalyst (1), and current-voltage characteristics were measured by performing the same operation as in Example 1.

From a curve of the current-voltage characteristics obtained, an oxygen reduction onset potential and a current density at 0.90 V were calculated. Table 2 indicates the measurement results.

Figure 16:
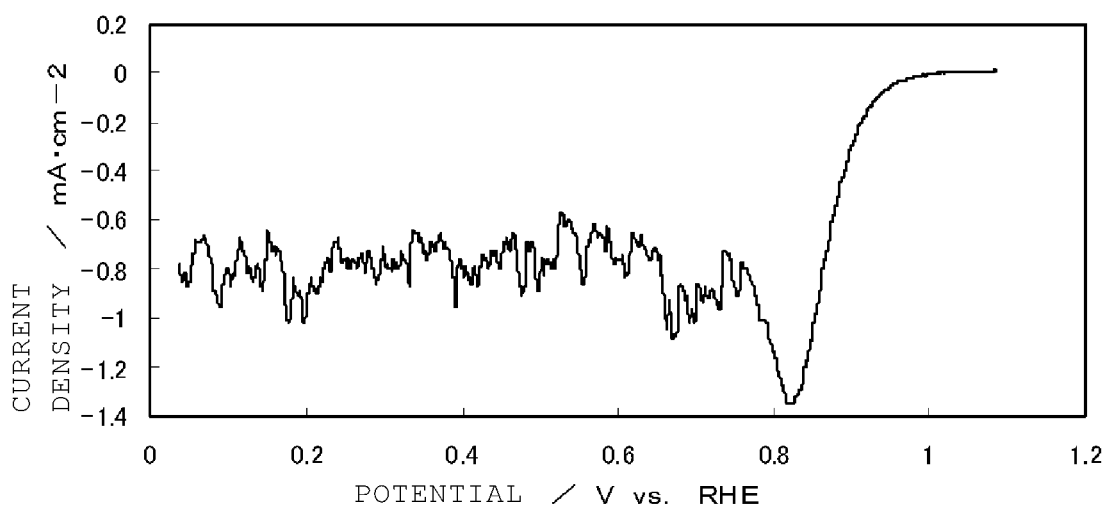
FIG. 16 is a graph illustrating the evaluation of oxygen reduction performance in a fuel cell electrode (13) of Comparative Example 3.

FIG. 16 depicts a current-potential curve obtained by the above measurement.

The catalyst (15) produced in Comparative Example 3 had an oxygen reduction onset potential of 1.02 V (vs. RHE) and an oxygen reduction current density of 0.29 mA/cm$^2$ at 0.9 V (vs. RHE).

4. Single Cell Evaluation

The preparation of a cathode catalyst ink (15), the production of a cathode (15), the production of a MEA (15), and the production of a single cell (15) were performed by the same operation as in Example 1 except that the catalyst (15) was used instead of the catalyst (1), and current-voltage characteristics were measured. From a curve of the current-voltage characteristics obtained, a current density at 0.75 V was calculated. The measurement result was listed in Table 2.

Comparative Example 4

1. Production of 5 wt % Pd-Supporting Carbon (Pd/C) Catalyst

To 150 ml of distilled water was added 612 mg of carbon black (KETJENBLACK EC300J manufactured by Ketjen Black International Company), and the mixture was shaken by an ultrasonic washing machine for 30 minutes. The resulting suspension was stirred on a hot plate to maintain the solution temperature at 80° C.

In addition to the suspension, there was prepared in advance a solution of 529.2 mg of tetraamminepalladium(II) chloride (equivalent to 32.2 mg of palladium) dissolved in 52 ml of distilled water.

Then, the above solution was added to the suspension over 30 minutes (the solution temperature was maintained at 80° C.) Subsequently, the suspension was stirred at the solution temperature of 80° C. for 2 hours.

Next, 1 M sodium hydroxide was slowly added until pH of the suspension became 11, and then, to the suspension was slowly added 1 M sodium borohydride in an amount allowing the above metal component (namely, tetraamminepalladium(II) chloride) to be sufficiently reduced (in which the ratio of sodium borohydride to the above metal component was 10:1 or more in a metal mole ratio). After that, the resulting suspension is stirred at the solution temperature of 80° C. for 1 hour. After completion of the reaction, the suspension is cooled down and filtered.

The resulting powder was thermally treated at 300° C. for 1 hour in a 4% by volume hydrogen-containing nitrogen atmosphere to give 644 mg of 5 wt % Pd-supporting carbon (Pd/C) catalyst (hereinafter described also as "catalyst (16)"). Table 3 indicates a specific surface area of the catalyst (16).

2. Single Cell Evaluation

The preparation of a cathode catalyst ink (16), the production of a cathode (16), the production of a MEA (16), and the production of a single cell (16) were performed by the same operation as in Example 11 except that the catalyst (16) was used instead of the catalyst (1), and current-voltage characteristics were measured.

From a curve of the current-voltage characteristics obtained, a current density at 0.30 V was calculated and the measurement result was listed in Table 3.

Comparative Example 5

1. Production of 5 wt % Pt-Supporting Carbon (Pt/C) Catalyst

To 150 ml of distilled water was added 612 mg of carbon black (KETJENBLACK EC300J manufactured by Ketjen Black International Company), and the mixture was shaken by an ultrasonic washing machine for 30 minutes. The resulting suspension was stirred on a hot plate to maintain the solution temperature at 80° C.

In addition to the suspension, there was prepared in advance a solution of 84.5 mg of chloroplatinic acid 6-hydrate (equivalent to 32.2 mg of platinum) dissolved in 52 ml of distilled water.

Then, the solution was added to the suspension over 30 minutes (the solution temperature was maintained at 80° C.). After that, the mixture was stirred at the solution temperature of 80° C. for 2 hours.

Next, 1M sodium hydroxide was slowly added until pH of the suspension becomes 11, and then, to the resulting suspension was slowly added 1M sodium borohydride in an amount allowing the above metal component (namely, chloroplatinic acid 6-hydrate) to be sufficiently reduced (in which the ratio of sodium borohydride to the above metal component was 10:1 or more in a metal mole ratio). After that, the resulting suspension is stirred at the solution temperature of 80° C. for 1 hour. After completion of the reaction, the suspension is cooled down and filtered.

The resulting powder was thermally treated at 300° C. for 1 hour in a 4% by volume hydrogen-containing nitrogen atmosphere to give 644 mg of 5 wt % Pt-supporting carbon (Pt/C) catalyst (hereinafter described also as "catalyst (17)"). Table 3 indicates a specific surface area of the catalyst (17).

2. Single Cell Evaluation

The preparation of a cathode catalyst ink (17), the production of a cathode (17), the production of a MEA (17), and the production of a single cell (17) were performed by the same operation as in Example 11 except that the catalyst (17) was used instead of the catalyst (1), and current-voltage characteristics were measured.

From a curve of the current-voltage characteristics obtained, a current density at 0.30 V was calculated and the measurement result was listed in Table 3.

Tables 1, 2, and 3 below indicate individual data of the above respective Examples and respective Comparative Examples.

TABLE 1

| Carrier | Carrier synthesis method | Composition of constituent elements of carrier (mole ratio) | | | | | | | | Specific surface area of carrier/ $m^2 \cdot g^{-1}$ |
|---|---|---|---|---|---|---|---|---|---|---|
| | | Ti | Nb | Zr | Ta | Fe | C | N | O | |
| (1) | Liquid phase | 1.00 | | | | | 2.35 | 0.05 | 1.40 | 212 |
| (2) | | 0.91 | | | | 0.09 | 2.70 | 0.07 | 1.30 | 244 |
| (3) | | | 0.90 | | | 0.10 | 2.70 | 0.43 | 2.00 | 219 |
| (4) | | | | 0.90 | | 0.10 | 4.30 | 0.10 | 1.80 | 253 |
| (5) | | | | | 0.91 | 0.09 | 1.82 | 0.15 | 1.99 | 225 |
| (6) | Solid phase | 1.00 | | | | 0.13 | | 0.03 | 1.74 | 11.7 |

TABLE 2

| | Carrier | Catalyst | Pt content in catalyst/ wt % | Specific surface area of catalyst/ $m^2 \cdot g^{-1}$ | Half cell evaluation | | | Single cell evaluation (Pt: 0.1 mg/cm$^2$) | |
|---|---|---|---|---|---|---|---|---|---|
| | | | | | Electrode | Oxygen reduction onset potential/V | Current density at 0.90 V/ mA · cm$^{-2}$ | Single cell | Current density at 0.75 V/ A · cm$^{-2}$ |
| Ex. 1 | (1) | (1) | 5 | 196 | (1) | 1.03 | 0.70 | (1) | 0.173 |
| Ex. 2 | (2) | (2) | 2.5 | 205 | (2) | 1.01 | 0.34 | (2) | 0.163 |
| Ex. 3 | (3) | (3) | 20 | 204 | (3) | 1.06 | 1.55 | (3) | 0.256 |

TABLE 2-continued

| | Carrier | Catalyst | Pt content in catalyst/ wt % | Specific surface area of catalyst/ $m^2 \cdot g^{-1}$ | Half cell evaluation | | | Single cell evaluation (Pt: 0.1 mg/cm$^2$) | |
|---|---|---|---|---|---|---|---|---|---|
| | | | | | Electrode | Oxygen reduction onset potential/V | Current density at 0.90 V/ $mA \cdot cm^{-2}$ | Single cell | Current density at 0.75 V/ $A \cdot cm^{-2}$ |
| Ex. 4 | | (4) | 15 | 210 | (4) | 1.06 | 1.49 | (4) | 0.243 |
| Ex. 5 | | (5) | 10 | 222 | (5) | 1.06 | 1.47 | (5) | 0.307 |
| Ex. 6 | | (6) | 5 | 230 | (6) | 1.05 | 1.38 | (6) | 0.209 |
| Ex. 7 | | (7) | 2.5 | 237 | (7) | 1.01 | 0.45 | (7) | 0.180 |
| Ex. 8 | (3) | (8) | 2.5 | 208 | (8) | 1.03 | 0.42 | (8) | 0.168 |
| Ex. 9 | (4) | (9) | 2.5 | 244 | (9) | 1.02 | 0.48 | (9) | 0.182 |
| Ex. 10 | (5) | (10) | 2.5 | 211 | (10) | 1.00 | 0.43 | (10) | 0.172 |
| Comp. Ex. 1 | | (14) | (5) *1 | | (11) | 1.05 | 0.50 | (14) | 0.158 |
| Comp. Ex. 2 | | | (2.5) *2 | | (12) | 1.02 | 0.34 | — | — |
| Comp. Ex. 3 | (6) | (15) | 5 | 11.8 | (13) | 1.02 | 0.29 | (15) | 0.012 |

*1 indicates that Pt weight is equivalent to catalyst with Pt content of 5 wt % in Half-cell evaluation.
*2 indicates that Pt weight is equivalent to catalyst with Pt content of 2.5 wt % in Half-cell evaluation.

TABLE 3

| | Catalyst metal/ carrier | | | Catalyst metal content/ wt % | Specific surface area of catalyst/ $m^2 \cdot g^{-1}$ | Single cell evaluation (catalyst metal: 0.1 mg/cm$^2$) | |
|---|---|---|---|---|---|---|---|
| | Catalyst metal | Carrier | Catalyst | | | Single cell | Current density at 0.30 V/ $A \cdot cm^{-2}$ |
| Ex. 11 | Pd | (2) | (11) | 5 | 204 | (11) | 0.100 |
| Ex. 12 | Pd—Pt | (2) | (12) | 5 | 201 | (12) | 0.092 |
| Ex. 13 | Pt | (2) | (13) | 5 | 205 | (13) | 0.083 |
| Comp. Ex. 4 | Pd/C | | (16) | 5 | 795 | (16) | 0.031 |
| Comp. Ex. 5 | Pt/C | | (17) | 5 | 793 | (17) | 0.051 |

INDUSTRIAL APPLICABILITY

The process for producing a catalyst carrier according to the present invention can provide a catalyst carrier that enhances the activity of a supported catalyst metal. Therefore, high catalytic performance can be achieved by supporting the catalyst metal on the produced catalyst carrier, as well as the amount of the supported catalyst metal used can be reduced. Then, as a result of this, the present invention can contribute to the production of a fuel cell having high performance at low cost.

In addition, the composite catalyst of the present invention can achieve high catalytic performance despite a low catalyst metal content and thus can be suitably used as any of various catalysts, particularly as a fuel cell catalyst.

The invention claimed is:

1. A process for producing a composite catalyst comprising:
   a step (a) of mixing a transition metal compound (1), a nitrogen-containing organic compound (2) and a solvent to provide a thermally treated product precursor solution;
   a step (b) of removing the solvent from the thermally treated product precursor solution;
   a step (c) of thermally treating a solid residue obtained in the step (b) at a temperature of 500 to 1100° C. to provide a thermally treated product; and
   a step (d) of providing a composite catalyst comprising the thermally treated product and a catalyst metal supported on the thermally treated product;
   wherein
   the transition metal compound (1) is partly or wholly a compound comprising a transition metal element (M1) selected from the group 4 and 5 elements of the periodic table as a transition metal element;
   one or both of the transition metal compound (1) and the nitrogen-containing organic compound (2) comprises an oxygen atom; and
   the catalyst metal is at least one selected from the group consisting of platinum, gold, silver, copper, palladium, rhodium, ruthenium, iridium, osmium, rhenium and an alloy made of two or more thereof.

2. The process for producing a composite catalyst according to claim 1, wherein the transition metal element (M1) is at least one selected from the group consisting of titanium, zirconium, niobium and tantalum.

3. The process for producing a composite catalyst according to claim 1, wherein the transition metal compound (1) further comprises a second transition metal compound containing at least one transition metal element (M2) selected from iron, nickel, chromium, cobalt, vanadium and manganese.

4. The process for producing a composite catalyst according to claim 1, wherein the transition metal compound (1) is at least one selected from the group consisting of a metal phosphate, a metal sulfate, a metal nitrate, a metal organic acid salt, a metal oxyhalide, a metal alkoxide, a metal halide, a metal halogen oxoate, a metal hypohalogenite and a metal complex.

5. The process for producing a composite catalyst according to claim 1, wherein in the step (a), a precipitation suppressant comprising a compound having a diketone structure is further mixed.

6. The process for producing a composite catalyst according to claim 5, wherein in the step (a), a solution of the transition metal compound (1) is mixed with the precipitation suppressant, and then the resultant solution is mixed with the nitrogen-containing organic compound (2).

7. The process for producing a composite catalyst according to claim 1, wherein the nitrogen-containing organic compound (2) has, in its molecule, at least one selected from functional groups such as an amino group, a nitrile group, an imide group, an imine group, a nitro group, an amide group, an azide group, an aziridine group, an azo group, an isocyanate group, an isothiocyanate group, an oxime group, a diazo group, a nitroso group; and a pyrrole ring, porphyrin ring, an imidazole ring, a pyridine ring, a pyrimidine ring and a pyrazine ring.

8. The process for producing a composite catalyst according to claim 1, wherein the nitrogen-containing organic compound (2) further has, in its molecule, at least one group selected from a hydroxyl group, a carboxyl group, an aldehyde group, an acid halide group, a sulfo group, a phosphoric acid group, a ketone group, an ether group and an ester group.

9. The process for producing a composite catalyst according to claim 1, wherein the content of the catalyst metal is 0.01 to 50% by weight based on the total weight of the composite catalyst.

* * * * *